(12) United States Patent
Nakane

(10) Patent No.: US 6,341,105 B1
(45) Date of Patent: Jan. 22, 2002

(54) LIGHT BEAM CONDENSING APPARATUS AND METHOD OF DRIVING OPTICAL RECORDING MEDIUM BY APPLYING THE APPARATUS

(75) Inventor: Kazuhiko Nakane, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/220,633

(22) Filed: Dec. 24, 1998

Related U.S. Application Data

(62) Division of application No. 08/395,922, filed on Feb. 28, 1995, now Pat. No. 5,974,011, which is a division of application No. 08/185,457, filed on Jan. 24, 1994, now abandoned.

(30) Foreign Application Priority Data

Mar. 31, 1993 (JP) ............................... 5-096846

(51) Int. Cl.⁷ ................................. G11B 5/09
(52) U.S. Cl. ................................. 369/44.27
(58) Field of Search ............................... 369/44.27, 116

(56) References Cited

U.S. PATENT DOCUMENTS

| 3,787,888 A | 1/1974 | Haskal | 369/116 |
| 4,125,859 A | 11/1978 | Oshida et al. | 369/112 |
| 4,853,915 A | 8/1989 | Takasago et al. | 369/58 |
| 5,042,020 A | * 8/1991 | Endo | 369/116 |
| 5,105,413 A | 4/1992 | Bakx | 369/116 |
| 5,289,451 A | * 2/1994 | Aashinuma et al. | 369/116 X |
| 5,291,471 A | 3/1994 | Russell | 369/112 |
| 5,349,592 A | 9/1994 | Ando | 369/116 |
| 5,434,840 A | 7/1995 | Ezuka et al. | 369/116 |
| 5,644,420 A | * 7/1997 | Nakane | 359/245 |
| 5,974,011 A | * 10/1999 | Nakane | 369/50 |

OTHER PUBLICATIONS

Yamanaka & Kubota "High Density Recording for Optical Disc by High Resolution" vol. 18, No. 12 (23–89).

Ando "Phase–Shifting Apodizer of Three or More Portions", Jan. 18, 1992.

\* cited by examiner

Primary Examiner—Aristotelis M. Psitos
(74) Attorney, Agent, or Firm—Leydig, Voit, & Mayer, Ltd.

(57) ABSTRACT

A light beam condensing apparatus is provided to introduce a condensing spot of a laser beam onto an optical recording medium such as optical disks, and a method of driving the optical recording medium by applying the apparatus is disclosed.

There is provided modulation means 111 provided between a collimate lens 102 and an objective lens 105, for externally controlling and varying an amplitude or a phase of a collimate beam 104. The modulation means 111 is mechanically or electrically driven. Further, the modulation means 111 can be switched according to an operation mode of a drive unit or a kind of a recording medium 106 so as to provide a desired condensing spot shape.

4 Claims, 25 Drawing Sheets

FIG. 1 (PRIOR ART)
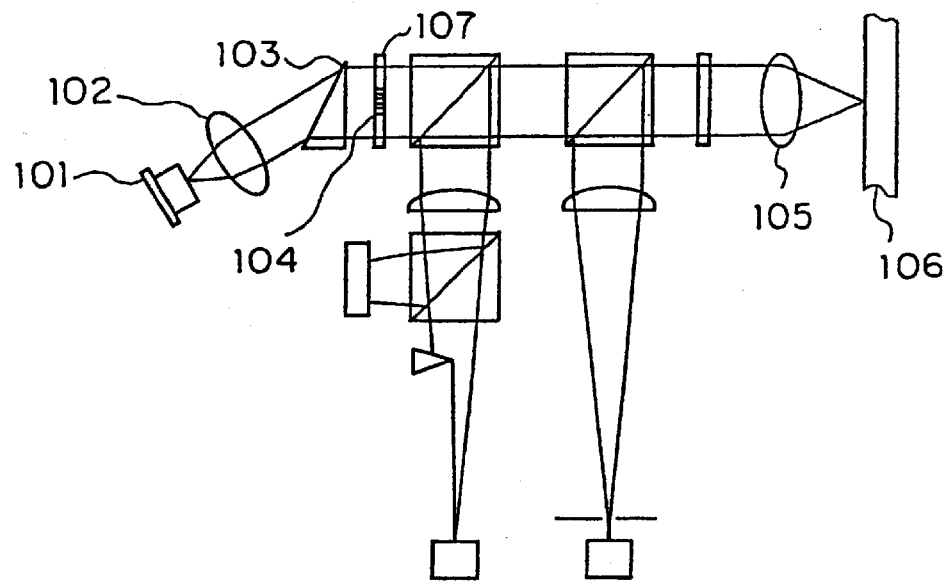
FIG. 2 (PRIOR ART)
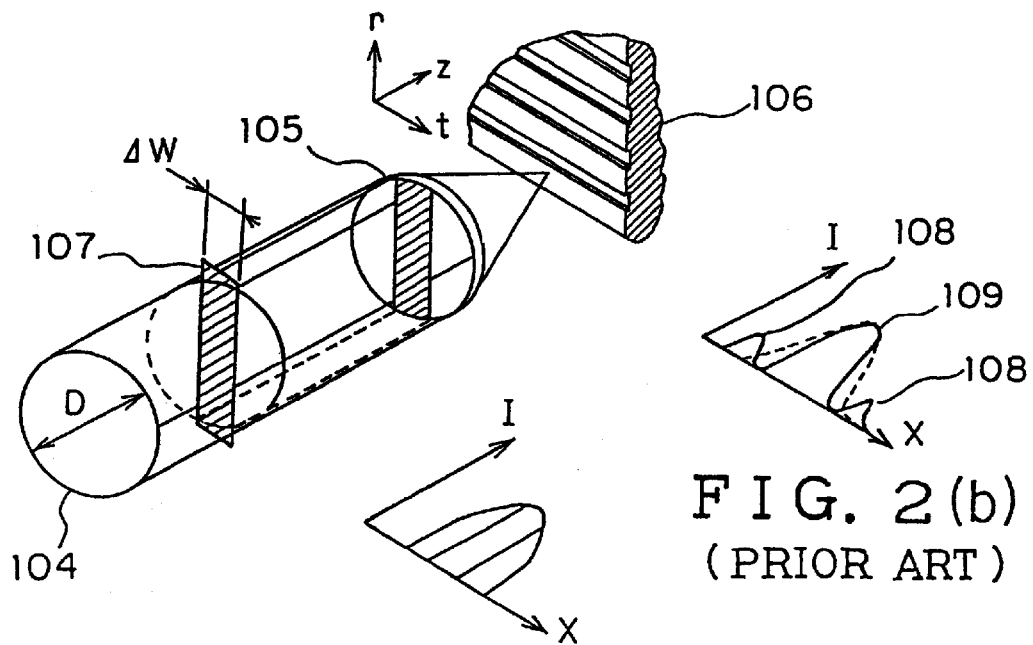
FIG. 2(a) (PRIOR ART)
FIG. 2(b) (PRIOR ART)

{ ▨ PORTION PROVIDING PASSING BEAM WITH FIRST PHASE MODULATION AMOUNT

▧ PORTION PROVIDING PASSING BEAM WITH SECOND PHASE MODULATION AMOUNT }

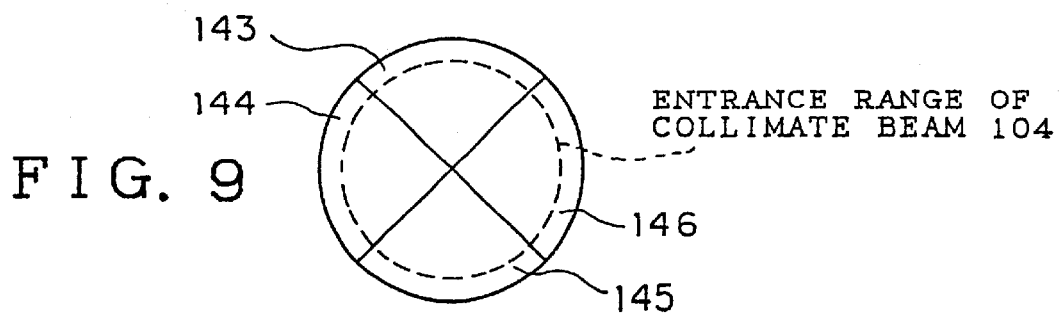
FIG. 9
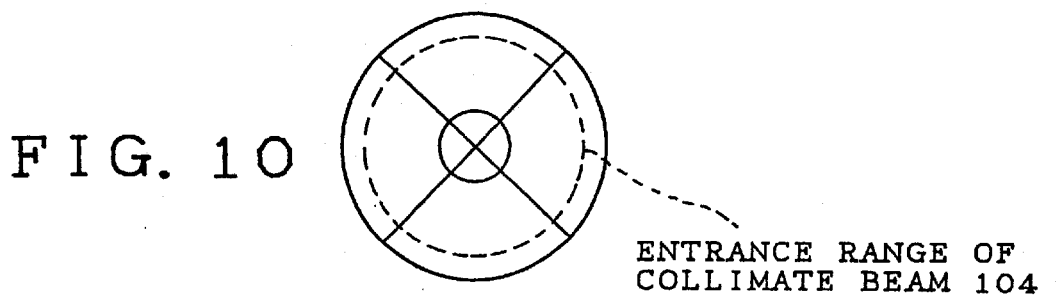
FIG. 10
FIG. 11
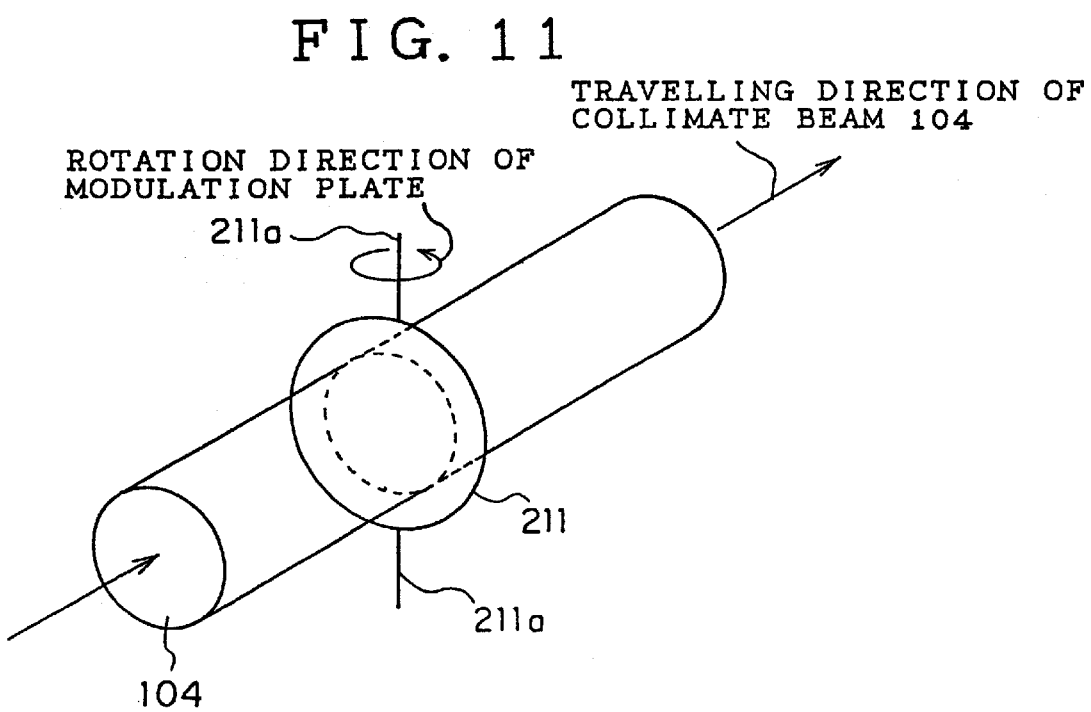

ROTATION DIRECTION OF MODULATION PLATE
TRAVELLING DIRECTION OF COLLIMATE BEAM
221
104
ENTRANCE DIRECTION OF COLLIMATE BEAM

ROTATION DIRECTION
222
223
TRAVELLING DIRECTION OF COLLIMATE BEAM
223
222  221

| EMBODIMENTS | MODULATION CONDITION |
|---|---|
| EMBODIMENTS 5 TO 9 | ☐ ----- AMPLITUDE OF TRANSMITTED LIGHT = LARGE<br>▨ ----- AMPLITUDE OF TRANSMITTED LIGHT = SMALL |
| THE EMBODIMENT 10 | ☐ ----- MODULATION AMOUNT OF PHASE OF TRANSMITTED LIGHT = SMALL<br>▨ ----- MODULATION AMOUNT OF PHASE OF TRANSMITTED LIGHT = LARGE |

FIG. 24
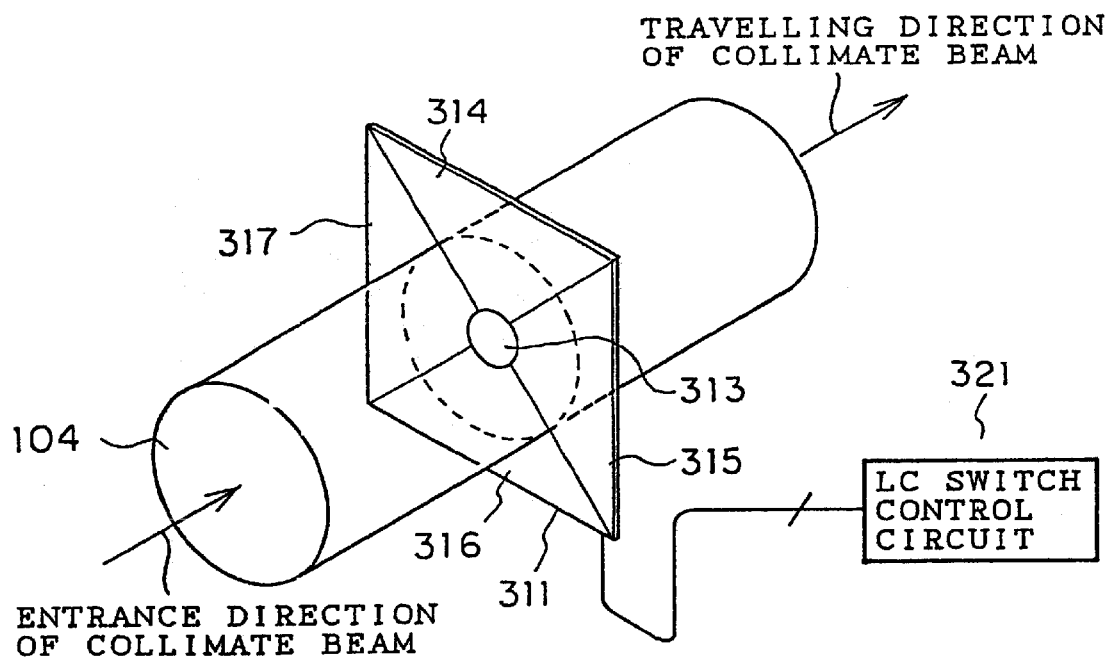
FIG. 25(a)
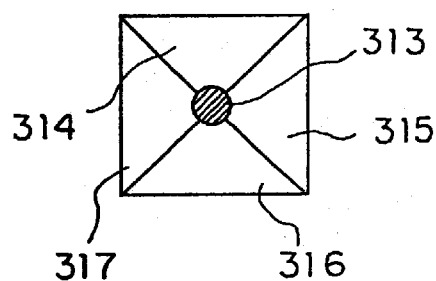
FIG. 25(b)
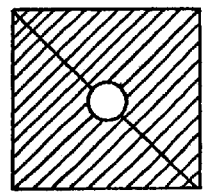
FIG. 25(c)
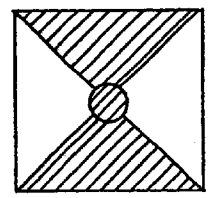
FIG. 25(d)
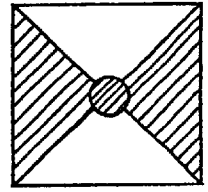
 SEGMENT OF LC SWITCH TO SHADE      SEGMENT OF LC SWITCH TO PASS CONDITIONS OF RESPECTIVE MODULATING SEGMENTS { ▨ FIRST INDEX OF REFRACTION = $n_1$
☐ SECOND INDEX OF REFRACTION = $n_2$ FIG. 31
| TRACK PITCH VALUE READ FROM PEP | MODE OF CONDENSED SPOT DIAMETER |
|---|---|
| NO MORE THAN 1.19 μm | REDUCTION |
| IN RANGE OF 1.20 TO 1.49 μm | ACTUAL SIZE |
| NO LESS THAN 1.50 μm | MAGNIFICATION |
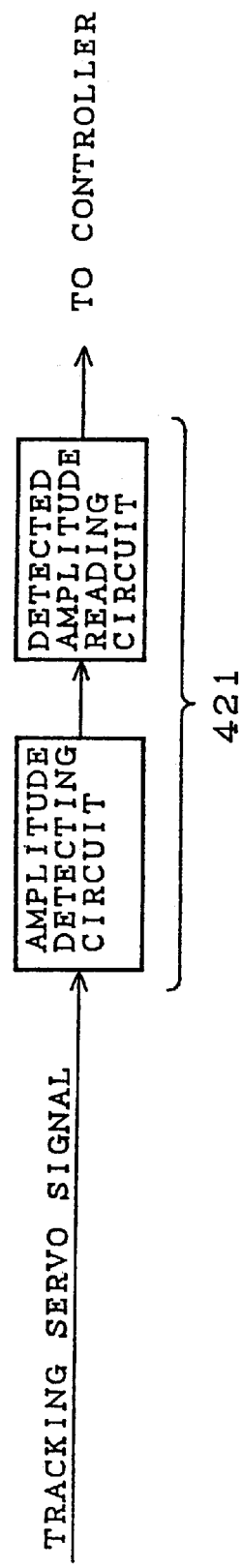
FIG. 33
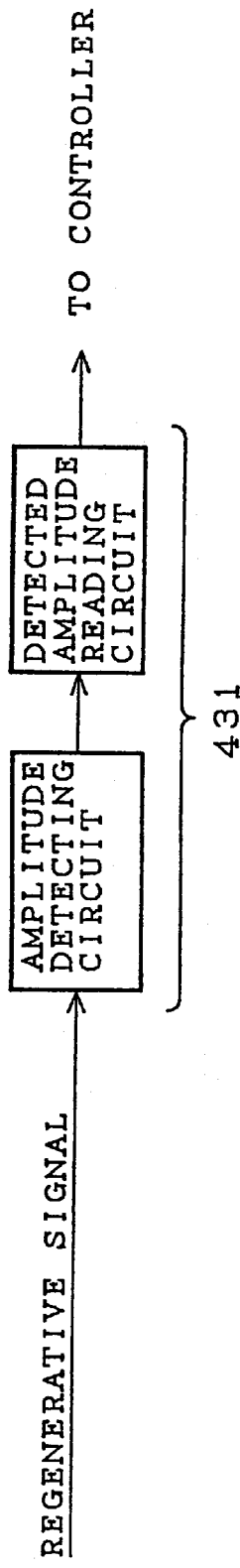
FIG. 35

FIG. 36
| OPERATION OF OPTICAL DISK DRIVING | SPOT SHAPE AND TRACK |
|---|---|
| SEEK | 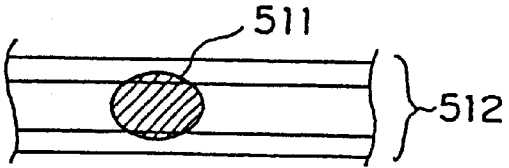 511, 512 |
| REGENERATE | 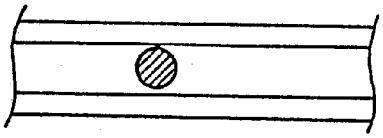 |
| RECORD | 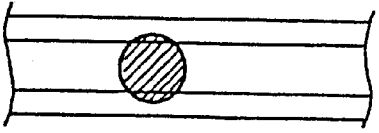 |
| ERASE | 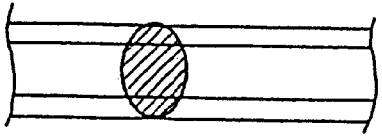 |

LIGHT BEAM CONDENSING APPARATUS AND METHOD OF DRIVING OPTICAL RECORDING MEDIUM BY APPLYING THE APPARATUS

This application is a divisional of application Ser. No. 08/395,922, filed Feb. 28, 1995, entitled LIGHT BEAM CONDENSING APPARATUS AND METHOD OF DRIVING OPTICAL RECORDING MEDIUM BY APPYING THE APPAREATUS, and now U.S. Pat. No. 5,974,011 which is a division of Ser. No. 08/185,457 filed Jan. 24, 1994 and now abandoned.

BACKGROUND OF THE INVENTION

1. Field of the Invention

The present invention relates to a light beam condensing apparatus to introduce a condensing spot of a laser beam onto an optical recording medium such as optical disks, and to a method of driving the optical recording medium by applying the apparatus.

2. Description of the Prior Art

There has been frequently studied a technique to improve recording density of an optical disk so as to provide a large capacity optical disk. Thus, it has been known that reduction of a condensing spot diameter of a laser light beam for recording and regeneration is very effective in the improvement of the recording density, and mean surface recording density substantially increases while being inversely proportional to the square of the condensing spot diameter $d_{SPOT}$. The condensing spot diameter $d_{SPOT}$ is proportional to a wavelength $\lambda$ of a laser to be used, and is inversely proportional to numerical aperture NA of an objective lens serving as a condenser, as shown in the following expression (1):

$$d_{SPOT} = k \cdot (\lambda/NA) \quad (1)$$

where the proportional constant k is defined by a wave front distribution of light wave incident on the lens. According to the expression (1), there are available three ways to reduce the condensing spot diameter $d_{SPOT}$, i.e., the first way of reducing the wavelength of the laser to be used, the second way of increasing the numerical aperture of the objective lens serving as the condenser, and the third way of using super resolution in a condensing optical system.

A description will now be given of a method for providing a small condensing spot diameter by utilizing the super resolution in the condensing optical system. This method has been often disclosed in articles such as 1) Yamanaka et al., "High Density Recording in Optical Disk by Super Resolution" in *Optics*, Vol.18, No.12, (1989), or 2) H. Ando, "Phase-Shifting Apodizer of Three or More Portions" in *Japanese Journal of Applied Physics*, Vol.31, (1992). In these methods disclosed in the articles, it is possible to reduce the condensing spot diameter on the basis of the same principle, as shown in FIGS. 1 and 2.

FIG. 1 shows a configuration of an optical system of a conventional super resolution optical head as an example. In FIG. 1, reference numeral 101 means a laser oscillator, 102 means a collimate lens, 103 is a beam forming prism, 105 is an objective lens, 106 is a recording medium, and 107 is a shading plate.

A description will now be given of the operation. Laser light from the laser oscillator 101 serving as a light source is collimated through the collimate lens 102 and the beam forming prism 103, resulting in parallel light. A laser beam 104 serving as the parallel light is focused and condensed by the objective lens 105 on a recording surface of the recording medium 106. Here, the shading plate 107 is disposed across the laser beam 104 so as to partially shade the laser beam 104. At the time, the condensing spot diameter $d_{SPOT}$ of the laser beam 104 is varied according to a position and a shape of the shading plate 107, that is, a width and a length thereof.

A description will now be given of the principle in the reduction of the condensing spot diameter by the super resolution with reference to FIG. 2. As shown in FIG. 2, in case the shading plate 107 is longer than a beam diameter D of the collimate beam 104, a condensing spot diameter $d_{SPOT}t$ in a cross direction of the shading plate is defined as a ratio of the beam diameter D to the width ΔW of the shading plate 107 if the width of the shading plate 107 is defined as ΔW. Further, a condensing spot diameter $d_{SPOT}r$ in a longitudinal direction of the shading plate 107 is substantially irrelevant to the width ΔW. Here, as the width ΔW becomes larger, sidelobes 108 in a condensing spot becomes higher while the condensing spot diameter $d_{SPOT}t$ of a mainlobe 109 becomes smaller.

FIG. 3 shows a relation between ΔW/D and the condensing spot $d_{SPOT}t$. As understood from FIG. 3, as ΔW/D is more increased, the condensing spot diameter $d_{SPOT}t$ is more reduced, and concurrently intensity of the sidelobe is more increased. Since increase of the sidelobe causes an increase of crosstalk, it is impossible to allow the sidelobe to become so large. Here, ΔW/D=0 if the shading plate 107 is not employed. At the time, if the condensing spot diameter is set to $d_{SPOT}0$, it is possible to reduce the condensing spot diameter $d_{SPOT}t$ to 10% degree as compared with $d_{SPOT}0$ when the sidelobe intensity can be in a range of 0.1 times the mainlobe or less. In such a way, it is possible to reduce the condensing spot diameter with the constant laser wavelength $\lambda$ and the constant numerical aperture NA of the lens by shading a vicinity of an intermediate portion of the collimate beam in a super-resolution optical head. When the shading plate 107 is coplanarly rotated by 90°, the condensing spot diameter $d_{SPOT}t$ is left as it is $d_{SPOT}0$, and the condensing spot diameter $d_{SPOT}r$ is reduced.

As set forth above, the principle of the super resolution utilizes the character of focusing light wave that it is possible to vary the intensity distribution at the condensing spot by modulating a wave front of the collimate beam 104 on an entrance surface of the objective lens 105. That is, the shading plate 107 shown in FIG. 2 corresponds to space modulation which is performed so as to set an amplitude distribution of the collimate beam 104 on the entrance surface of the objective lens 105 to zero in the vicinity of the intermediate portion of the collimate beam 104. Accordingly, laser power at a shaded portion is lost.

Further, on the basis of the principle of the super resolution, it is also possible to vary the intensity distribution of the condensing spot by modulating a phase distribution of the collimate beam 104 on the entrance surface of the objective lens 105. That is, it is possible to form a condensing spot shape by providing appropriate phase shift according to a position on the entrance surface of the objective lens 105. This method is employed in the article 2) as described before. In this case, the collimate beam 104 is not shaded so that there is no partial loss of the laser power due to the shading.

Alternatively, in another known technique, a distribution is caused in indexes of refraction in order to provide phase modulation to transmitted light. Assumed that there is difference Δn between the indexes of refraction sensed by the transmitted light at two portions of a modulation plate when light having the wavelength λ passes through the modulation plate having a thickness of L. Consequently, in the light beam passing through both the portions, there is generated a phase difference Δφ expressed by the following expression (2):

$$\Delta\phi = 2\pi(L/\lambda) \cdot \Delta n \qquad (2)$$

A phase of the transmitted light is modulated by the phase difference. It must be noted that a method of the phase modulation of the transmitted light should not be limited to a method to provide a difference in an optical path length by the difference in the indexes of refraction. It is similarly possible to provide the difference in the optical path length by varying the thickness of the modulation plate so as to perform the phase modulation of the transmitted light.

The recording density of the optical disk can be expressed by the product of recording density in a direction parallel to a recording track (i.e., track recording density BPI) and recording density in a direction perpendicular to the recording track (i.e., track density TPI). Therefore, it is possible to improve surface recording density of the optical disk by improving the BPI and the TPI, respectively. The conventional embodiment shown in FIG. 2 is provided to improve the BPI. For example, if a concentrically circular shading plate to shade the intermediate portion exclusively is employed instead of the shading plate 107 shown in FIG. 2, the condensing spot has a concentrically circular shape so that the mainlobe 109 is surrounded by the sidelobe 108. In this case, the condensing spot diameter of the mainlobe 109 can be reduced. Thus, it is possible to concurrently improve the BPI and the TPI by using the condensing spot.

As set forth above, the reduction of the condensing spot diameter by the super resolution is an effective technique to improve the recording density. According to the prior art, it is possible to provide a constant condensing spot diameter by varying the amplitude or the phase of the transmitted light by a fixed optical component such as the shading plate, or the phase plate. However, in the prior art, it is impossible to vary a parameter of the super resolution, that is, the modulation amount applied to the wave front of the collimate beam on the entrance surface of the objective lens during the operation in one condensing apparatus so as to dynamically vary the condensing spot diameter or the condensing spot shape of an optical disk unit.

On the other hand, in the current market, there are employed the optical disks compatible to the optical disk standard which is standardized by the ISO standard or the like. Most of these disks have a track pitch of 1.6 ($\mu$m) and the track recording density of 25 (kbit/inch). Further, the large capacity optical disk has been developed in recent years, and the track pitch is more reduce and the track recording density is more increased if it is possible to provide the practical large capacity optical disk having more improved recording density than that of the conventional optical disk. Accordingly, a condensing spot diameter smaller than that in the prior art is required for recording and regenerating information. The condensing spot diameter can be provided by applying a shorter wavelength laser, an objective lens having larger numerical aperture, or the super resolution as described before. In this case, it is to be understood that the condensing spot diameter is designed so as to be adaptable to the track pitch or the track recording density of a newly developed large capacity optical disk.

Here, compatibility of an optical disk drive becomes a major issue. That is, in case the optical disk drive is provided with a function to drive both the newly developed large capacity optical disk and the optical disks based upon the conventional standard, there are the following three problems. The first problem relates to a tracking servo. A servo sensor signal for tracking is detected depending upon diffraction phenomena of the spot on the disk surface because of a guide groove, i.e., a periodic structure of a groove and a land on the optical disk. Hence, if the condensing spot is designed so as to be adaptable to a narrow-width track pitch, there is a drawback in that it is not possible to sufficiently provide a servo error signal for tracking when the conventional optical disk having a wide-width track pitch is driven.

The second problem occurs at a time to read an emboss signal. While information of the emboss signal is recorded on the optical disk in a form of a phase bit, the signal regeneration is performed depending upon a principle that condensed light is diffracted by the phase bit, and an amount of reflected light to be received by the detector is varied according to the presence or absence of the bit. Therefore, it is impossible to provide a sufficient variation rate by the diffraction in case the condensing spot diameter is too small with respect to the phase bit. As a result, there is another drawback in that reading accuracy is reduced or incapability of reading occurs due to a reduced regenerative amplitude of the emboss signal.

The third problem occurs when the information on the medium is erased in a rewritable optical disk. In optical disks which is recorded and erased by thermal energy of the condensed light such as magneto-optical medium, or phase varying medium, when a signal recorded on a low density medium having the wide-width track is erased by the condensing spot having a small diameter, it is impossible to erase an entire width of the recorded mark since an erasable width is narrow, resulting in an unerased portion. As a result, there is still another drawback in that the unerased portion is left as the crosstalk, and increases occurrence of regeneration error when the erasing and recording is repeated.

SUMMARY OF THE INVENTION

In view of the foregoing, it is an object of the present invention to provide a light beam condensing apparatus which can ensure compatibility of many kinds of optical recording media as a main function required in a medium interchangeable information recording apparatus, and a method of driving an optical recording medium by applying the light beam condensing apparatus.

It is another object of the present invention to attempt improvement of main performances required in the optical disk drive, such as improvement of data reliability and seek reliability, and extension of a disk receiving range by effectively using functions which can realized according to the present invention.

According to the first aspect of the present invention, for achieving the above-mentioned objects, there is provided a light beam condensing apparatus including an objective lens to condense a collimate beam so as to introduce a condensing spot of the collimate beam onto an optical recording medium, and modulation means for varying a shape of the condensing spot by modulating the collimate beam.

As stated above, in the light beam condensing apparatus according to the first aspect of the present invention, a laser beam emitted from a laser oscillator is transformed into the collimate beam by a collimate lens. The objective lens condenses the collimate beam to introduce the condensing spot of the collimate beam onto the optical recording medium. Further, the modulation means varies the shape of the condensing spot by modulating the collimate beam. Therefore, it is possible to use a small-diameter condensing spot with respect to a high recording density medium, and use a large-diameter condensing spot with respect to a low recording density medium.

According to the second aspect of the present invention, there is provided a light beam condensing apparatus including modulation means for varying a shape of a condensing spot by modulating a collimate beam, and control means for controlling the modulation means to vary the shape of the condensing spot.

As stated above, in the light beam condensing apparatus according to the second aspect of the present invention, since the control means is provided to control the modulation means, it is possible to control the modulation means.

According to the third aspect of the present invention, there is provided a light beam condensing apparatus to vary transmission factor of a collimate beam by modulation means so as to vary a shape of a condensing spot.

As stated above, in the light beam condensing apparatus according to the third aspect of the present invention, it is possible to vary the transmission factor of the collimate beam by the modulation means so as to vary the shape of the condensing spot. As a result, it is possible to adjust a diameter of the condensing spot according to high or low recording density of an optical recording medium.

According to the fourth aspect of the present invention, there is provided a light beam condensing apparatus to vary a phase of a collimate beam by modulation means so as to vary a shape of a condensing spot.

As stated above, in the light beam condensing apparatus according to the fourth aspect of the present invention, it is possible to vary the phase of the collimate beam by the modulation means so as to vary the shape of the condensing spot. Therefore, it is possible to reduce or extend a diameter of the condensing spot without shading the collimate beam.

According to the fifth aspect of the present invention, there is provided a light beam condensing apparatus to modulate a collimate beam so as to vary a shape of a condensing spot when a modulation plate is positioned in a direction perpendicular to an optical axis of the collimate beam, and to cease the modulation of the collimate beam when modulation means is positioned in a direction parallel to the optical axis of the collimate beam.

As stated above, in the light beam condensing apparatus according to the fifth aspect of the present invention, the modulation means is provided in a flat shape, and it is possible to modulate the collimate beam so as to vary the shape of the condensing spot when the modulation plate is positioned in the direction perpendicular to the optical axis of the collimate beam, and to cease the modulation of the collimate beam when modulation means is positioned in the direction parallel to the optical axis of the collimate beam. Therefore, the shape of the condensing spot can be switched over by simply rotating the flat modulation means.

According to the sixth aspect of the present invention, there is provided a light beam condensing apparatus in which modulation means is rotatably supported about an optical axis of a collimate beam when the modulation means is positioned in a direction perpendicular to the optical axis of the collimate beam.

As stated above, in the light beam condensing apparatus according to the sixth aspect of the present invention, the flat modulation means can be rotated about the optical axis of the collimate beam when the modulation means is positioned in the direction perpendicular to the optical axis of the collimate beam. Therefore, a shape of a condensing spot can be switched over as in the fifth aspect, and the condensing spot can be reduced in all directions by rotating the modulation means about the optical axis.

According to the seventh aspect of the present invention, there is provided a light beam condensing apparatus in which, when any one of modulation plates is positioned in a direction perpendicular to an optical axis of a collimate beam to vary a shape of a condensing spot, the other modulation plate is positioned in a direction parallel to the optical axis of the collimate beam.

As stated above, the light beam condensing apparatus according to the seventh aspect of the present invention includes the pair of modulation plates which are mounted in a substantially cross form, and when any one of the modulation plates is positioned in the direction perpendicular to the optical axis of the collimate beam to vary the shape of the condensing spot, the other modulation plate is positioned in the direction parallel to the optical axis of the collimate beam. Therefore, two kinds of condensing spot diameters can be switched over from one to another by positioning the one modulation plate and the other modulation plate in the direction perpendicular to the optical axis of the collimate beam.

According to the eighth aspect of the present invention, there is provided a light beam condensing apparatus including modulation means. The modulation means has a cylindrical body whose peripheral surface is provided with a modulation pattern, and a shape of a condensing spot is varied by positioning the modulation pattern of the peripheral surface across a course of a collimate beam.

As stated above, the light beam condensing apparatus according to the eighth aspect of the present invention includes the cylindrical modulation means whose peripheral surface is provided with the modulation pattern, and it is possible to vary the shape of the condensing spot by positioning the modulation pattern of the peripheral surface across the course of the collimate beam. Therefore, since a plurality of modulation patterns can be formed on the peripheral surface of the cylindrical body, it is possible to provide different types of the shapes of the condensing spot.

According to the ninth aspect of the present invention, there is provided a light beam condensing apparatus in which modulation means includes a pair of modulation plates, and when the respective modulation plates are positioned in a direction perpendicular to an optical axis of a collimate beam, the respective modulation plates are coplanarly positioned, and a modulation pattern is provided by the respective modulation plates.

As stated above, in the light beam condensing apparatus according to the ninth aspect of the present invention, the modulation means includes the pair of modulation plates, and when the respective modulation plates are positioned in the direction perpendicular to the optical axis of the collimate beam, the respective modulation plates are coplanarly positioned, and the modulation pattern is provided by the respective modulation plates. Therefore, it is possible to optionally select a modulation mode to provide no modulation by positioning the respective modulation plates in a direction parallel to the optical axis of the collimate beam, a first modulation mode to provide the collimate beam with first modulation by positioning so as to pass the collimate beam through a half surface of one of the respective modulation plates, and a second modulation mode to provide the collimate beam with second modulation by positioning so as to pass the collimate beam through a half surface of the other of the respective modulation plates.

According to the tenth aspect of the present invention, there is provided a light beam condensing apparatus including modulation means. The modulation means has a modulation plate which is provided with a plurality of modulation patterns, and is supported slidably in a direction perpendicular to an optical axis of a collimate beam, and the modulation means can position a desired modulation pattern in the plurality of modulation patterns across an optical path of the collimate beam.

As stated above, the light beam condensing apparatus according to the tenth aspect of the present invention includes the modulation means. The modulation means has the modulation plate which is provided with the plurality of modulation patterns, and is supported slidably in the direction perpendicular to the optical axis of the collimate beam, and the modulation means can position the desired modulation pattern in the plurality of modulation patterns across the optical path of the collimate beam. Therefore, it is possible to easily increase the number of the modulation patterns.

According to the eleventh aspect of the present invention, there is provided a light beam condensing apparatus including modulation means. The modulation means has a modulation plate which is formed by a plurality of optical components, and is disposed across an optical path of a collimate beam, and the modulation means varies a modulation pattern of the modulation plate by applying voltage to the optical components.

As stated above, the light beam condensing apparatus according to the eleventh aspect of the present invention includes the modulation means. The modulation means has the modulation plate which is formed by the plurality of optical components, and is disposed across the optical path of the collimate beam, and the modulation means can vary the modulation pattern of the modulation plate by applying the voltage to the optical components. Therefore, since the modulation pattern can be electrically varied, it is possible to accelerate a switching speed.

According to the twelfth aspect of the present invention, there is provided a light beam condensing apparatus in which a modulation pattern of modulation means is formed by a rectangular modulation section positioned at an intermediate portion of a collimate beam, and having a longitudinal side longer than a collimate beam diameter, and by a modulation section positioned at the other portion of the collimate beam.

As stated above, in the light beam condensing apparatus according to the twelfth aspect of the present invention, the modulation pattern of the modulation means is formed by the rectangular modulation section which is positioned at the intermediate portion of the collimate beam, and has the longitudinal side longer than the collimate beam diameter, and by the modulation section positioned at the other portion of the collimate beam. Therefore, it is possible to reduce or extend a diameter of a condensing spot in one direction by the modulation section at the intermediate portion.

According to the thirteenth aspect of the present invention, there is provided a light beam condensing apparatus in which a modulation pattern of modulation means is formed by a circular modulation section positioned coaxially with a collimate beam, and having a diameter smaller than a collimate beam diameter, and by a modulation section positioned at the other portion of the collimate beam.

As stated above, in the light beam condensing apparatus according to the thirteenth aspect of the present invention, the modulation pattern of the modulation means is formed by the circular modulation section positioned coaxially with the collimate beam, and having the diameter smaller than the collimate beam diameter, and by the modulation section positioned at the other portion of the collimate beam. Therefore, it is possible to reduce or extend a diameter of a condensing spot by the circular modulation section in all directions.

According to the fourteenth aspect of the present invention, there is provided a method of driving an optical recording medium by applying a light beam condensing apparatus. The method comprises the steps of setting a condensing spot shape of a condensing beam focused into a recording bit area of an optical recording medium to be adaptable to a track pitch, and performing recording and regeneration of the optical recording medium at the condensing spot having the set shape.

As stated above, in the method of driving the optical recording medium by applying the light beam condensing apparatus according to the fourteenth aspect of the present invention, track pitch information in the recording bit area is read by the condensing beam emitted from the light beam condensing apparatus to control modulation means of the light beam condensing apparatus depending upon the read track pitch information so as to modulate a collimate beam, and the condensing spot shape of the condensing beam focused into the recording bit area of the optical recording medium is set to be adaptable to the track pitch. Therefore, the condensing spot can be switched over according to the track pitch of the optical recording medium.

According to the fifteenth aspect of the present invention, there is provided a method of driving an optical recording medium by applying a light beam condensing apparatus. The method comprises the steps of detecting an amplitude of a tracking servo sensor signal at a time of a set condensing spot shape, adjusting the set condensing spot shape by controlling modulation means so as to maximize the detected amplitude, and performing recording and regeneration of the optical recording medium at the adjusted condensing spot.

As stated above, in the method of driving the optical recording medium by applying the light beam condensing apparatus according to the fifteenth aspect of the present invention, the amplitude of the tracking servo sensor signal at the time of set condensing spot shape is detected, and the set condensing spot shape is adjusted by controlling the modulation means so as to maximize the detected amplitude. Therefore, it is possible to absorb variation in the tracking servo signal which is different for each combination of the optical recording medium and a drive unit thereof.

According to the sixteenth aspect of the present invention, there is provided a method of driving an optical recording medium by applying a light beam condensing apparatus. The method comprises the steps of detecting an amplitude of a regenerative signal of an emboss signal before performing regeneration of the optical recording medium with a condensing spot, and controlling modulation means to maximize the detected amplitude so as to adjust a condensing spot shape to be optimal for information regeneration.

As stated above, in the method of driving the optical recording medium by applying the light beam condensing apparatus according to the sixteenth aspect of the present invention, it is possible to detect the amplitude of the regenerative signal of the emboss signal before performing the regeneration of the optical recording medium with the condensing spot, and control the modulation means to maximize the detected amplitude so as to adjust the condensing spot shape to be optimal for the information regeneration. Therefore, it is possible to absorb variation in an information regenerating signal characteristic which is different for each combination of the optical recording medium and a drive unit thereof.

According to the seventeenth aspect of the present invention, there is provided a method of driving an optical recording medium by applying a light beam condensing apparatus. The method comprises the steps of setting a condensing spot shape to have a large diameter by controlling modulation means of the light beam condensing apparatus before reading track pitch information in a recording bit area.

As stated above, in the method of driving the optical recording medium by applying the light beam condensing apparatus according to the seventeenth aspect of the present invention, it is possible to set the condensing spot shape to have the large diameter by controlling the modulation means of the light beam condensing apparatus before reading the track pitch information in the recording bit area. Therefore, it is possible to improve reading accuracy of the track pitch information in the recording bit area with respect to various types of optical recording media.

According to the eighteenth aspect of the present invention, there is provided a method of driving an optical recording medium by applying a light beam condensing apparatus. The method comprises the steps of setting a condensing spot shape in a large size by controlling modulation means of the light beam condensing apparatus before focusing on a control track area for reading track pitch information.

As stated above, in the method of driving the optical recording medium by applying the light beam condensing apparatus according to the eighteenth aspect of the present invention, it is possible to set the condensing spot shape in the large size by controlling the modulation means of the light beam condensing apparatus before the focus pulling in for reading the track pitch information in the recording bit area. Therefore, it is possible to improve stability of the focus pulling in.

According to the nineteenth aspect of the present invention, there is provided a method of driving an optical recording medium by applying a light beam condensing apparatus. The method comprises the steps of controlling modulation means of the light beam condensing apparatus according to a driving condition of the recording medium to switch a shape of a condensing spot which is focused on the optical recording medium.

As stated above, in the method of driving the optical recording medium by applying the light beam condensing apparatus according to the nineteenth aspect of the present invention, the light beam condensing apparatus is provided to emit a laser beam from a laser oscillator, transform the emitted laser beam into a collimate beam and condense the collimate beam so as to introduce the beam into a bit area of the optical recording medium. In the light beam condensing apparatus, it is possible to control the modulation means of the light beam condensing apparatus according to the driving condition of the recording medium so as to switch the shape of the condensing spot which is focused on the optical recording medium. Therefore, control can be made such that spot shape modification is provided at a time of seek and regeneration, and the spot shape modification is not provided at a time of recording.

According to the twentieth aspect of the present invention, there is provided a method of driving an optical recording medium by applying a light beam condensing apparatus. The method comprises the steps of, in case it is detected that sector read is not normal at a time of regeneration of the optical recording medium, controlling modulation means depending upon the detected signal so as to adjust a condensing spot shape, retry the sector read, and repeat the above steps until the sector read can be normally performed.

As stated above, in the method of driving the optical recording medium by applying the light beam condensing apparatus according to the twentieth aspect of the present invention, it is possible to, in case it is detected that the sector read is not normal at the time of regeneration of the optical recording medium, control the modulation means depending upon the detected signal so as to adjust the condensing spot shape, retry the sector read, and repeat the above steps until the sector read can be normally performed. Therefore, it is possible to improve such a possibility that a condition incapable of reading a signal can be avoided.

The above and further objects and novel features of the invention will more fully appear from the following detailed description when the same is read in connection with the accompanying drawing. It is to be expressly understood, however, that the drawings are for purpose of illustration only and are not intended as a definition of the limits of the invention.

BRIEF DESCRIPTION OF THE DRAWINGS

FIG. 1 is a general view of a conventional super-resolution light beam condensing apparatus;

FIG. 2 is an explanatory view illustrating a principle of reduction of a condensing spot diameter according to a conventional super resolution;

FIG. 9 is a plan view of another space modulation pattern of the modulation means according to the present invention;

FIG. 10 is a plan view of still another space modulation pattern of the modulation means according to the present invention;

FIG. 11 is an explanatory view illustrating space amplitude modulation using a rotary modulation plate according to the present invention;

FIG. 23 is an explanatory view illustrating conditions of phase modulation by the modulation means according to the present invention;

FIG. 24 is an explanatory view illustrating space amplitude modulation using a flat liquid crystal switch according to the present invention;

FIG. 25 is an explanatory view illustrating a method of controlling the flat liquid crystal switch according to the present invention;

FIG. 31 is an explanatory view illustrating a method of setting the condensed spot diameter with respect to the track pitch according to the present invention;

FIG. 33 is a block diagram of an amplitude monitor circuit for a tracking servo sensor signal according to the present invention;

FIG. 35 is a block diagram of an amplitude monitor circuit for a regenerative signal according to the present invention;

FIG. 36 is an explanatory view illustrating control of each condensing spot shape for each operation of optical disk driving according to the present invention;

DETAILED DESCRIPTION OF THE PREFERRED EMBODIMENTS

Preferred embodiments of the invention will now be described in detail referring to the accompanying drawings.

Embodiment 1

Figure 3:
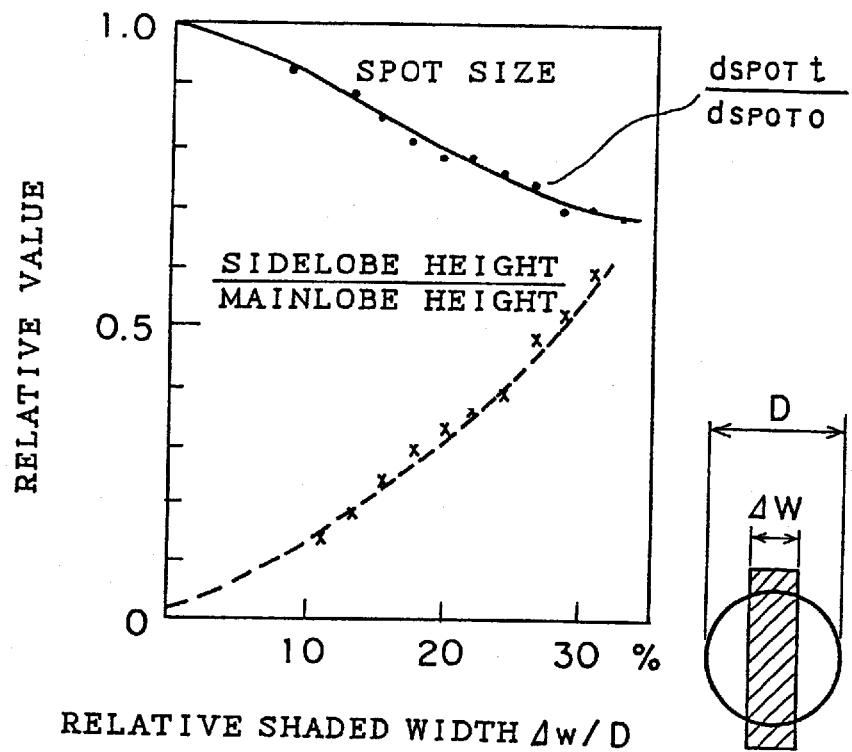
FIG. 3 is an explanatory view illustrating a relationship between a conventional shading plate width and the condensing spot diameter.
Figure 4:
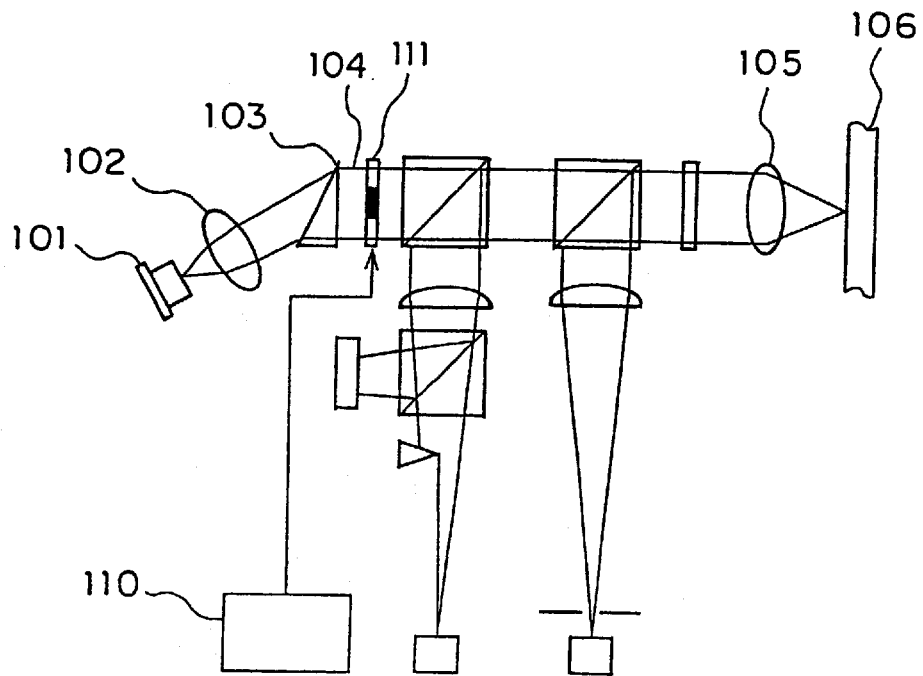
FIG. 4 is a general view of a condensing spot shape variable type of light beam condensing apparatus according to the present invention.

A description will now be given of one embodiment of the present invention. FIG. 4 is a general view of a light beam condensing apparatus according to one embodiment of the present invention. In FIG. 4, reference numeral 110 means control means, and 111 means modulation means. In FIG. 4, component parts identical with or equivalent to those of a conventional light beam condensing apparatus shown in FIG. 1 are designated by the same reference numerals, and descriptions thereof are omitted.

A description will now be given of the operation. A laser light from a laser oscillator 101 serving as a light source is collimated through a collimate lens 102 and a beam forming prism 103, resulting in parallel light. A collimate beam 104 serving as the parallel light is focused and condensed upon a recording surface of a recording medium (optical recording medium) 106 through an objective lens 105. In this case, the modulation means 111 is mounted across the collimate beam 104 so that the modulation means 111 partially shades the collimate beam 104.

Figure 5:
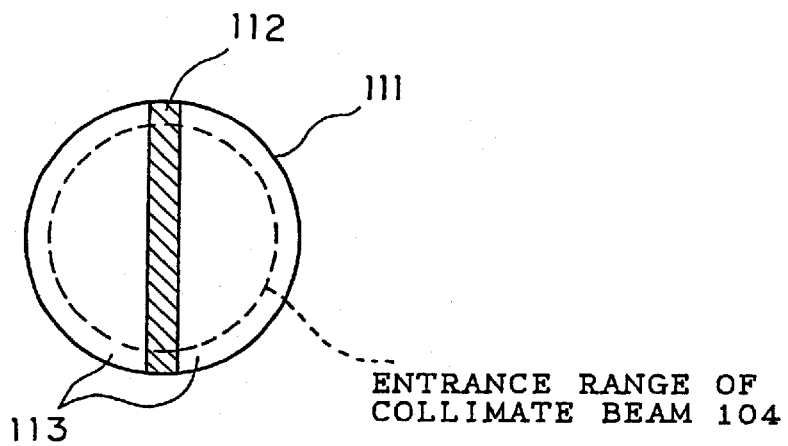
FIG. 5 is a plan view of a transmission factor variable modulation plate according to the present invention.

A description will now be given of the modulation means 111. FIG. 5 shows an arrangement principle of the modulation means 111 according to the embodiment 1. In FIG. 5, reference numeral 112 means an intermediate portion of a beam transmitting surface of the modulation means 111, and 113 means a side portion thereof. In the arrangement, it is possible to control transmission factor of the intermediate portion (i.e., a modulation portion positioned at the intermediate portion) 112 by an external signal. Next, the operation will be described hereinafter. When the control means 110 is controlled so as to set the transmission factor of the intermediate portion 112 to zero, that is, provide a shaded condition, as in a conventional shading plate 107 shown in FIG. 1, it is possible to obtain a super-resolution spot having a diameter reduced in one direction. Further, when the control means 110 is controlled so as to set the transmission factor of the intermediate portion 112 to 1, that is, provide a transparent condition, it is possible to obtain a normal condensing spot without the super resolution.

It is thereby possible to drive a high recording density medium by using a small-diameter condensing spot, and drive a low recording density medium by using the normal condensing spot. As a result, both a conventionally standardized medium and a large capacity medium can be driven by the same optical head.

Embodiment 2

Figure 6:
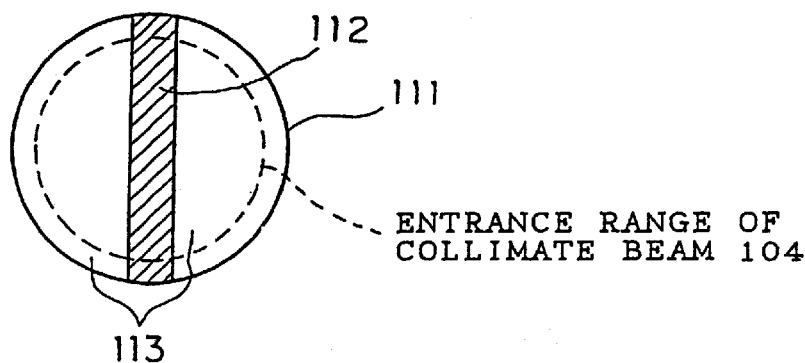
FIG. 6 is a plan view of modulation means for modulating an amplitude of the transmitting light according to the present invention.

FIG. 6 shows an arrangement principle of modulation means 111 according to the embodiment 2. Though it is possible to control the transmission factor of the intermediate portion 112 exclusively in the embodiment 1, in the embodiment 2, it is possible to control the transmission factor of the intermediate portion 112, and the transmission factor of side portions 113, 113 in response to a signal from control means 110. Thus, the embodiment 2 is different from the embodiment 1 in that it is possible to obtain a condensing spot having a larger diameter in one direction than that of a normal condensing spot by setting the transmission factor of the intermediate portion 112 to 1, and setting the transmission factor of the side portions 113, 113 to zero in the embodiment 2. When a low recording density medium is driven by an optical head for driving a large capacity medium by using, for example, a shorter wavelength laser rather than super resolution, the modulation means 111 according to the embodiment 2 is effective in extending a spot in a radial direction of an optical disk to manage a wide-width track pitch.

Embodiment 3

Figure 7:
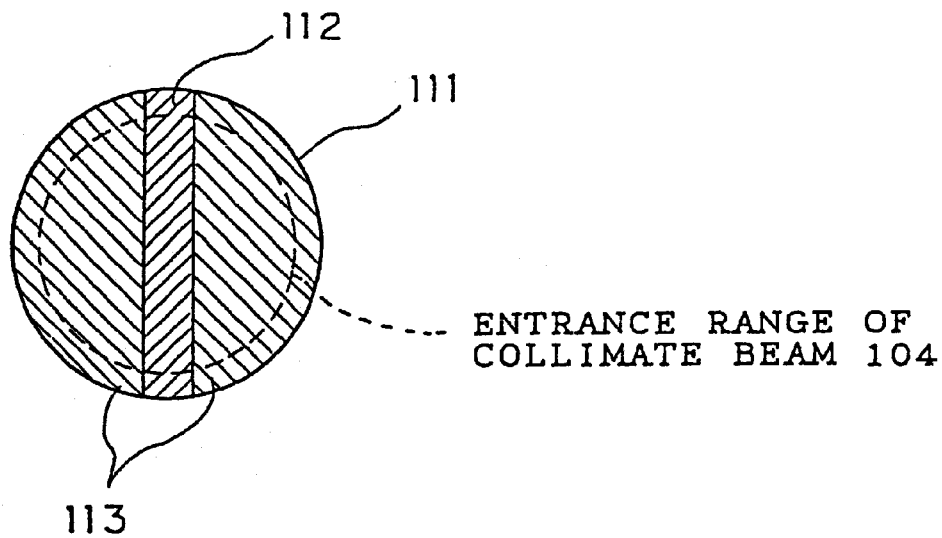
FIG. 7 is a plan view of modulation means for modulating a phase of the transmitting light according to the present invention.

FIG. 7 shows an arrangement principle of modulation means 111 according to the embodiment 3. Though it is possible to control the transmission factor in the embodiment 2, in the embodiment 3, it is possible to control index of refraction to transmitted light at an intermediate portion 112 of the modulation means 111, and index of refraction to transmitted light at side portions (a modulation portion positioned at a portion other than the intermediate portion 112) 113, 113 in response to a signal from control means 110. Thereby, while modulation is provided in the amplitude distribution of the transmitted light in the embodiment 2, the modulation is provided in a phase distribution of the transmitted light in the embodiment 3. In this regard, the embodiment 3 is different from the embodiment 2. Therefore, in the embodiment 3, it is possible to reduce and extend a condensing spot diameter as in the embodiment 2, and prevent loss of power due to shading, which can not be prevented in the embodiment 2.

The embodiment 3 has been described with reference to a case where the modulation is provided in the phase distribution of the transmitted light. However, it must be noted that the present invention should not be limited to this case, and both the amplitude distribution and the phase distribution of the transmitted light may be concurrently modulated so as to provide a more appropriate condensing spot shade.

Embodiment 4

Figure 8:
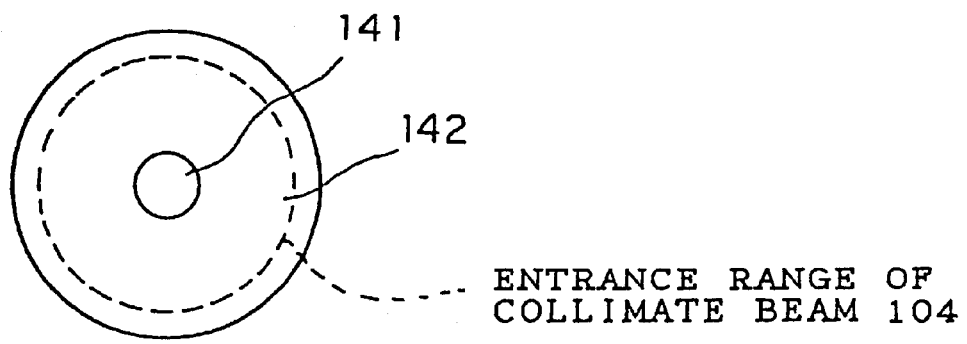
FIG. 8 is a plan view of a space modulation pattern of modulation means according to the present invention.

The embodiments 1 to 3 have been described with reference to a case where the modulation means 111 is divided into three sections. However, it must be noted that the present invention should not be limited to the division of the modulation means 111 into the three sections. For example, the modulation means 111 may be divided into two sections, i.e., a circular inner portion 141 concentric with a collimate beam 104 and a ring type outer portion 142 as shown in FIG. 8 according to the embodiment 4. It is thereby possible to provide a super-resolution spot having a diameter reduced in all directions, or a condensing spot having a diameter extended in all directions by controlling light transmission factor and index of refraction of the inner portion 141 and the outer portion 142.

FIG. 9 shows the modulation means 111 which is divided by substantially X-shaped lines into four sections. In this case, when a control signal is provided to generate the same modulation amount at two components 143 and 145 or 144 and 146 having vertically opposite angles, it is possible to obtain the condensing spot having a diameter which is reduced in one direction, and is extended in another direction perpendicular to the direction.

Referring to FIG. 10, the embodiments in FIGS. 8 and 9 are combined. In the embodiment shown in FIG. 10, it is possible to combine control methods of the modulation means 111 which are respectively enabled in the embodiments in FIGS. 8 and 9. Therefore, setting of a condensing spot shape can be flexibly varied by the methods as described in the embodiments in FIGS. 8 and 9. As a result, according to the embodiment shown in FIG. 10, it is possible to provide the optimal condition for media having various types of track densities and recording densities.

Embodiment 5

The embodiments 1 to 4 have been described with reference to a case where a collimate beam 104 is modulated by controlling the light transmission factor and the index of refraction of the modulation means 111. However, the collimate beam 104 may be modulated by mechanically rotating a modulation plate 211 of the modulation means 111 as shown in FIG. 11 according to the embodiment 5. The embodiment 5 will be hereinafter described with reference to FIG. 11. The modulation plate 211 is provided in a disk-like form as shown in FIG. 11, and the modulation plate 211 has a thickness which can be neglected with respect to a beam width. The modulation plate 211 is rotatably supported on an optical axis of the collimate beam 104 through rotation axes 211a, 211a. The rotation of the modulation plate 211 is controlled by control means 110 shown in FIG. 4.

Figure 12:
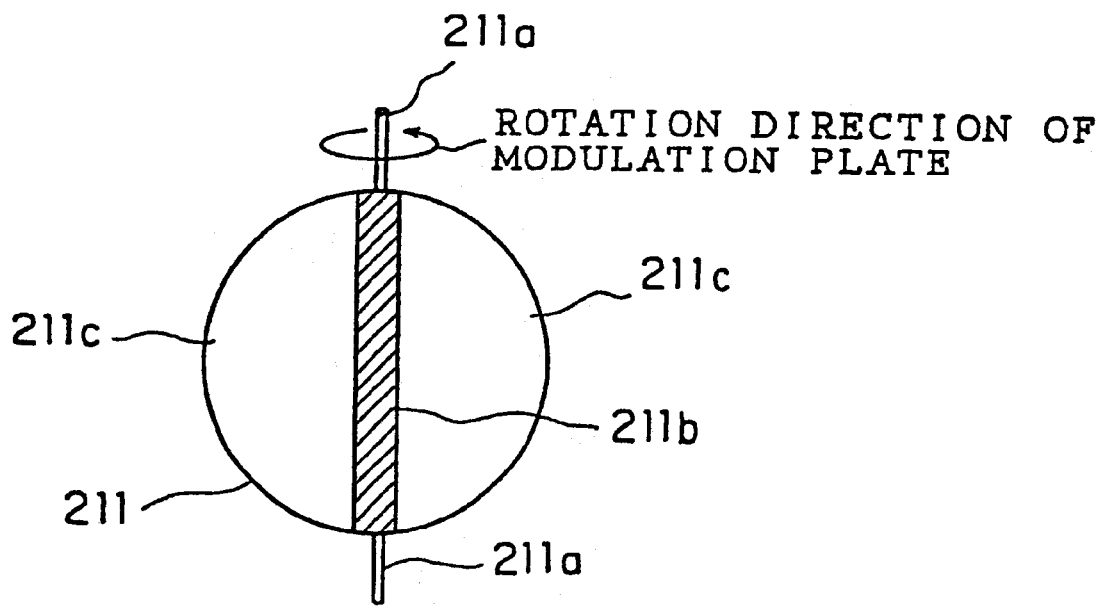
FIG. 12 is a plan view of the rotary modulation plate according to the present invention.

As shown in FIG. 12, the modulation plate 211 includes an intermediate portion 211b, and side portions 211c, 211c. Light transmission factor of the intermediate portion 211b is set to zero, and light transmission factor of the side portions 211c, 211c is set to 1. Accordingly, when the modulation plate 211 is directed perpendicular to the collimate beam 104, an intermediate portion of the collimate beam 104 is shaded. On the other hand, when the modulation plate 211 is directed parallel to the collimate beam 104, the collimate beam 104 is not modulated and, passes through the modulation plate 211. Thus, it is possible to provide the same effect as that in the embodiment 1.

Figure 13:
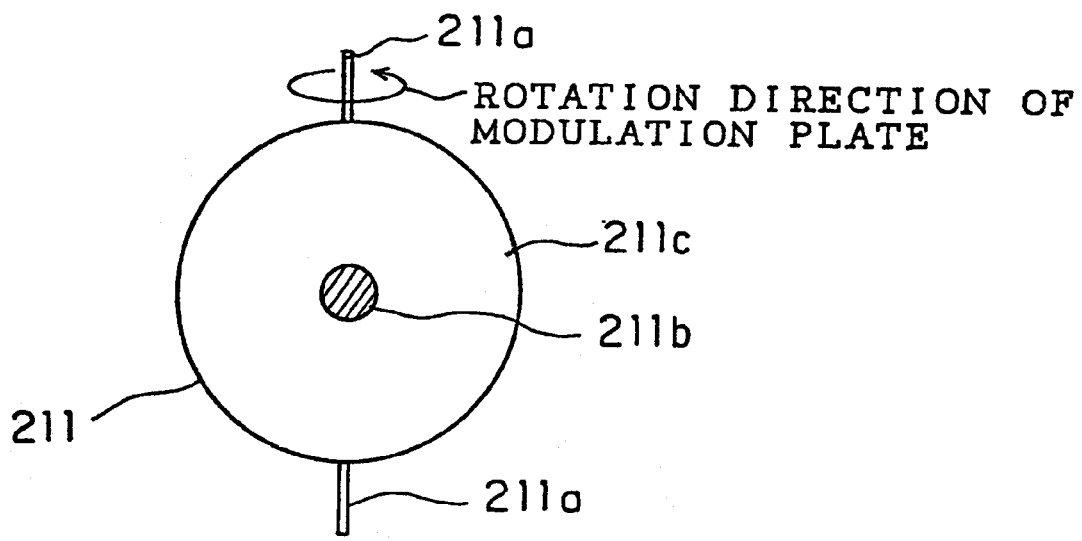
FIG. 13 is a plan view of the rotary modulation plate according to the present invention.

A modulation plate 211 shown in FIG. 13 is divided as in the embodiment 4 shown in FIG. 8, and light transmission factor of the shaded portion 211b is set to zero, and the other portion 211c is set to 1. Consequently, it is possible to provide the same effect as that in the embodiment 4 by rotating the modulation plate 211.

Figure 14A:
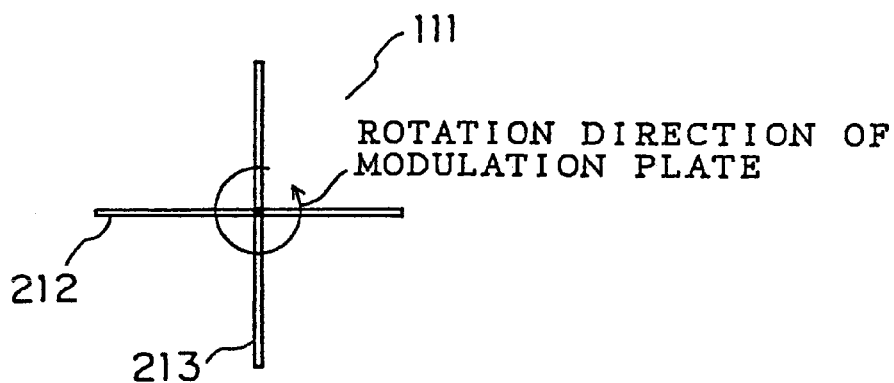
FIG. 14 is a plan view, a top view, and a side view of a two-plane rotary modulation plate.
Figure 14B:
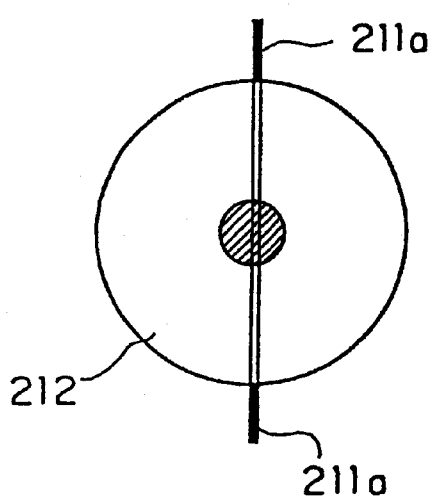
Figure 14C:
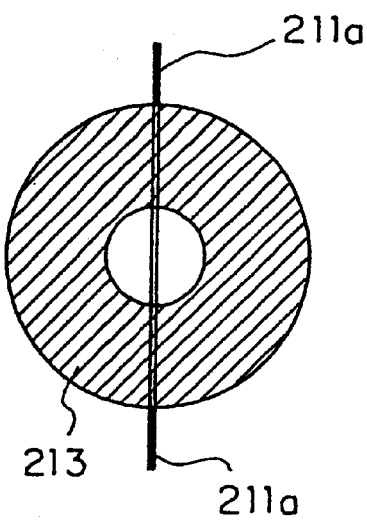

In modulation means 111 shown in FIG. 14, a modulation plate 212 and a modulation plate 213 are combined at right angle by sharing the rotation axes 211a, 211a. Therefore, two kinds of super-resolution effects, or reduction and extension of a beam diameter can be switched over from one to another by switching a rotation angle of the modulation means 111 such that one of the modulation plates is directed perpendicular to the collimate beam 104, and the other is disposed parallel thereto.

As set forth above, according to the embodiment 5, it is possible to drive a high recording density medium by a small-diameter condensing spot, and drive a low recording density medium by a normal condensing spot. As a result, both a conventionally standardized medium and a large capacity medium can be driven by the same optical head. Alternatively, when the low recording density medium is driven, the modulation means 111 according to the embodiment 5 is effective in extending a spot in a radial direction of an optical disk to manage a wide-width track pitch.

Embodiment 6

Figure 15:
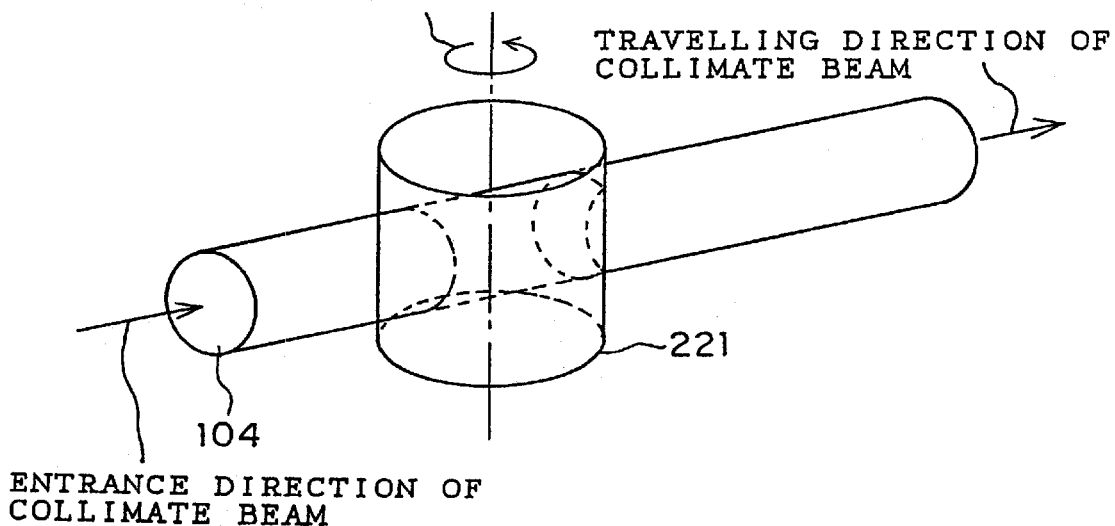
FIG. 15 is an explanatory view illustrating space amplitude modulation using a cylindrical rotary modulation plate according to the present invention.
Figure 16:
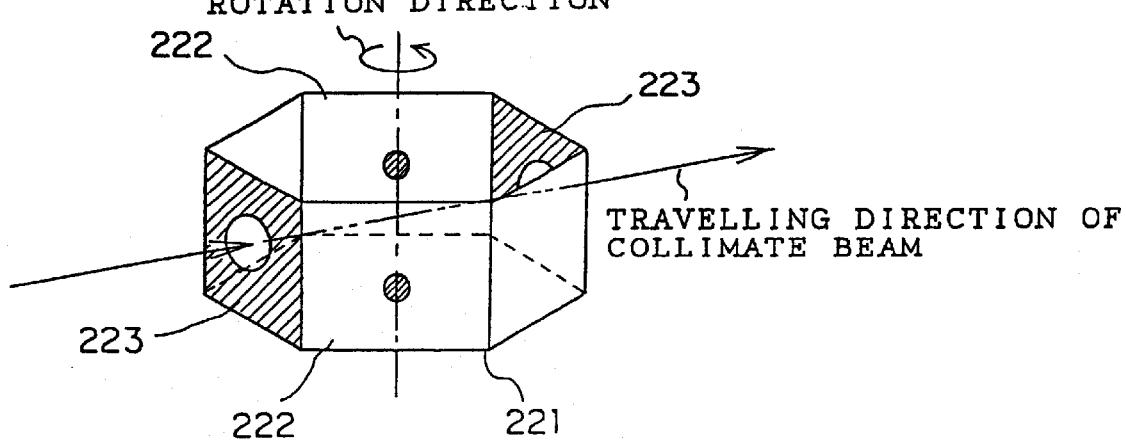
FIG. 16 is a perspective view of a rectangular and cylindrical rotary modulation plate according to the present invention.
Figure 17:
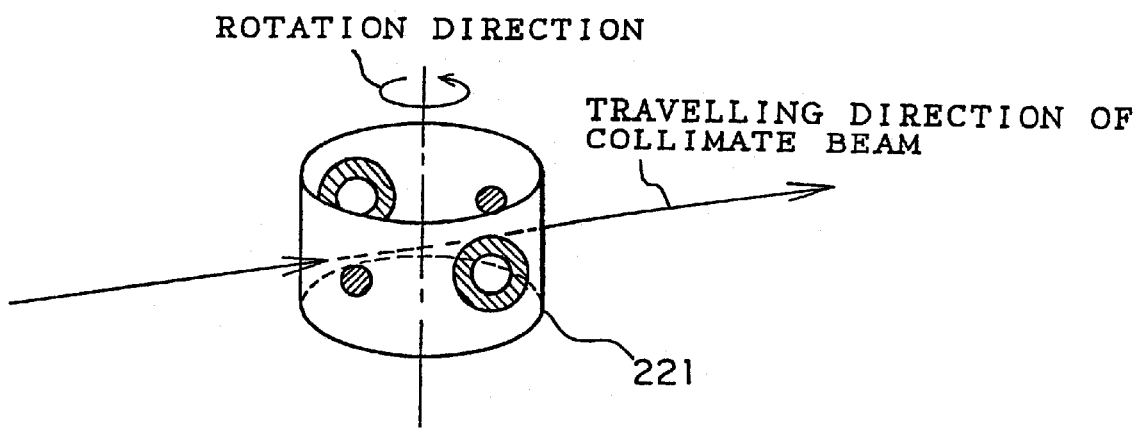
FIG. 17 is a perspective view of a cylindrical rotary modulation plate according to the present invention.

The embodiment 5 has been described with reference to a case where a laser beam is modulated by rotating the modulation plate 211 of the modulation means 111. However, the modulation means 111 may be provided as shown in FIG. 15. As shown in FIG. 15, modulation means 221 is provided in a hollow cylindrical form, or in a hollow rectangular and cylindrical form. In either case, the modulation means 221 is rotatably supported at a position to shade a collimate beam 104. FIGS. 16 and 17 shown specific patterns of light transmission factor in the modulation means.

The modulation means 221 shown in FIG. 16 can provide a super-resolution condensing spot depending upon the same principle as that described in the embodiment 1. That is, when the light transmission factor is set to zero at the shaded portion, and is set to 1 at the other portion, and a modulation plate 222 is directed perpendicular to the collimate beam 104, a beam intermediate portion is shaded to provide a condensing spot having a reduced diameter. Further, when the modulation means 221 is rotated to direct the modulation plate 223 in a direction perpendicular to the collimate beam 104, a peripheral portion of the beam is shaded to provide a condensing spot having an extended diameter.

In the modulation means 211 shown in FIG. 17, a modulation pattern in provided on a peripheral surface of a cylinder. It must be noted that a shape of the modulation means 221 should not be limited to these embodiments.

Embodiment 7

Figure 18:
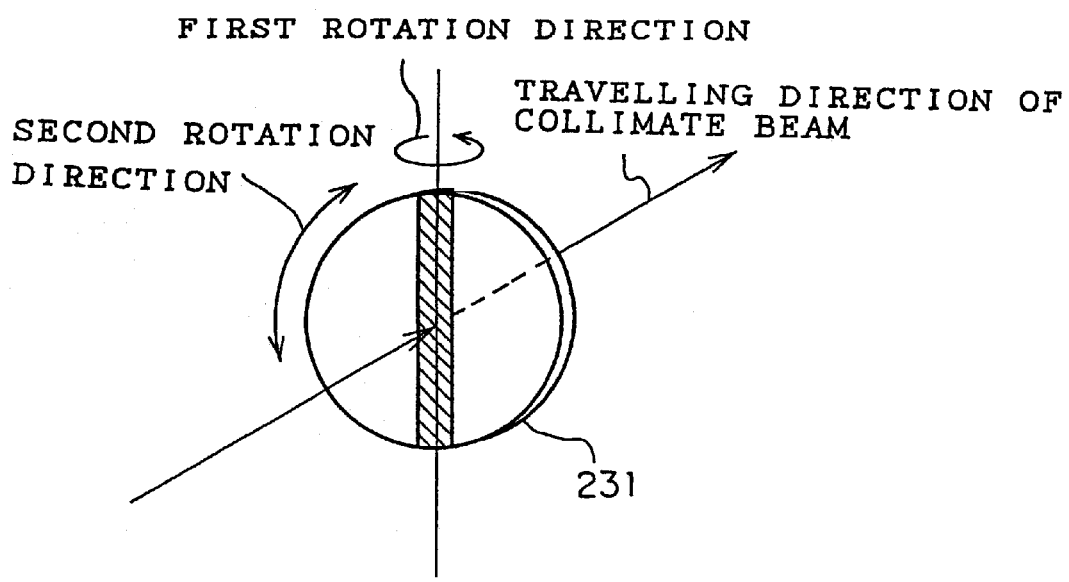
FIG. 18 is a perspective view of a two-axis rotary modulation plate according to the present invention.

The embodiment 5 has been described with reference to a case where the modulation plate 211 is rotated about the rotation axes 211a, 211a. However, in addition to the same function as that in the embodiment 5, another function may be provided to rotate modulation means 231 about an optical axis of a collimate beam 104 as shown in FIG. 18. In this case, if a transmitted light mutilation pattern in the embodiment 7 is formed as in the transmitted light modulation pattern illustrated in the embodiment 5, it is possible to reduce a condensing spot of a beam in one direction as in the embodiment 5, and rotate the modulation means 231 about the optical axis of the collimate beam 104 so as to reduce the condensing spot in all directions.

By making use of the above fact, it is possible to realize an operation that a large servo signal is obtained by reducing a condensing spot diameter in a radial direction of a disk during seek, and a large data regeneration signal is obtained by reducing the condensing spot diameter in a circumferential direction of the disk during regeneration.

Embodiment 8

Figure 19:
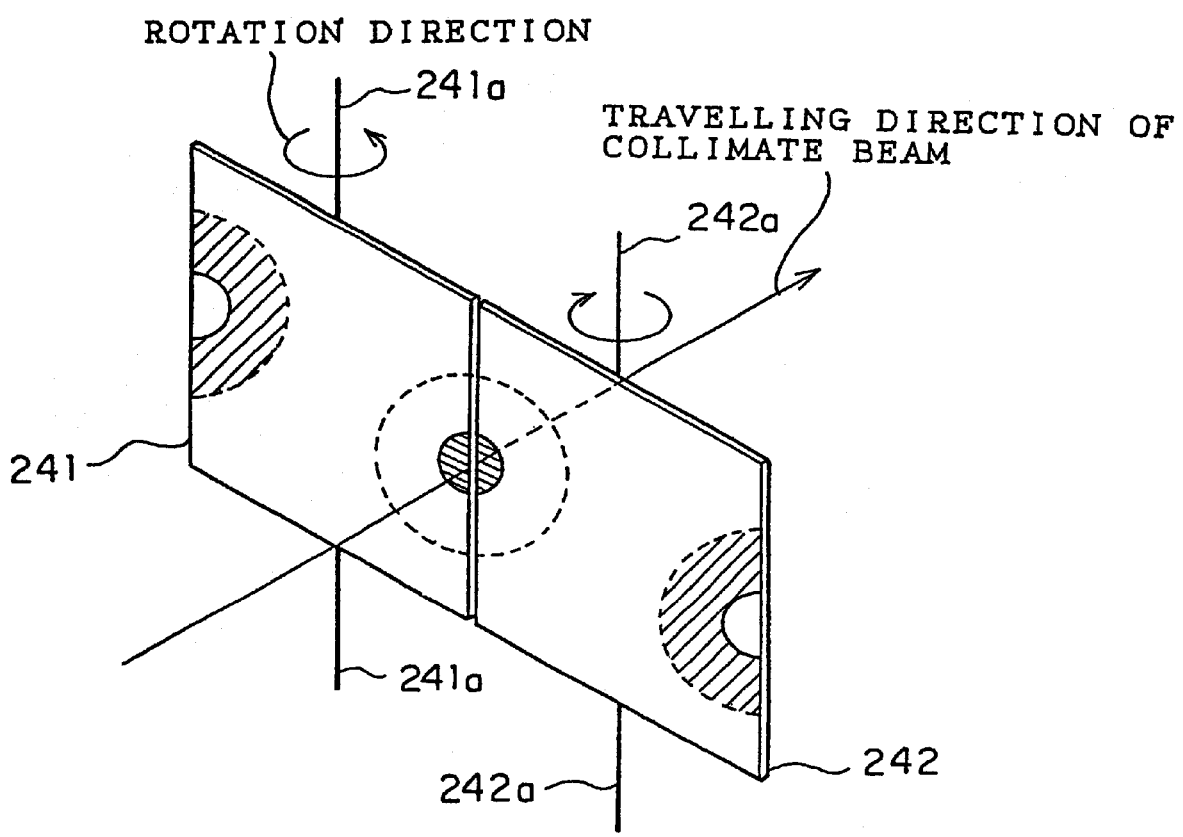
FIG. 19 is a perspective view of a pair of rotary modulation plates according to the present invention.

In the embodiment 8 shown in FIG. 19, modulation means includes optical components which are mechanically driven. As shown in FIG. 19, the modulation means of the embodiment 8 includes two modulation plates 241, 242. The modulation plates 241, 242 have thicknesses which can be neglected with respect to a beam width, and have a function of rotating about axes 241a, 242a. In this case, the rotation axes 241a and 242a of the modulation plates 241, 242 are supported on both sides of a collimate beam 104 such that edges of the modulation plates 241, 242 are opposed to each other at an intermediate position.

A description will now be given of the operation. First, it is possible to set a mode to provide the collimate beam 104 with no modulation by directing the modulation plates 241 and 242 parallel to the collimate beam 104. Secondly, it is possible to set a mode to provide the collimate beam 104 with a first modulation by positioning so as to pass the collimate beam 104 through a half surface of one of the modulation plates 241 and 242. Thirdly, it is possible to set a mode to provide the collimate beam with second modulation by positioning so as to pass the collimate beam through another half surface of the other of the modulation plates 241 and 242. In such a way, at least three types of modulation modes can be set according to the embodiment 8. The two modulation plates 241, 242 may be synchronously rotated so as to provide a desired condensing spot shape, or may be independently rotated.

Embodiment 9

Figure 20:
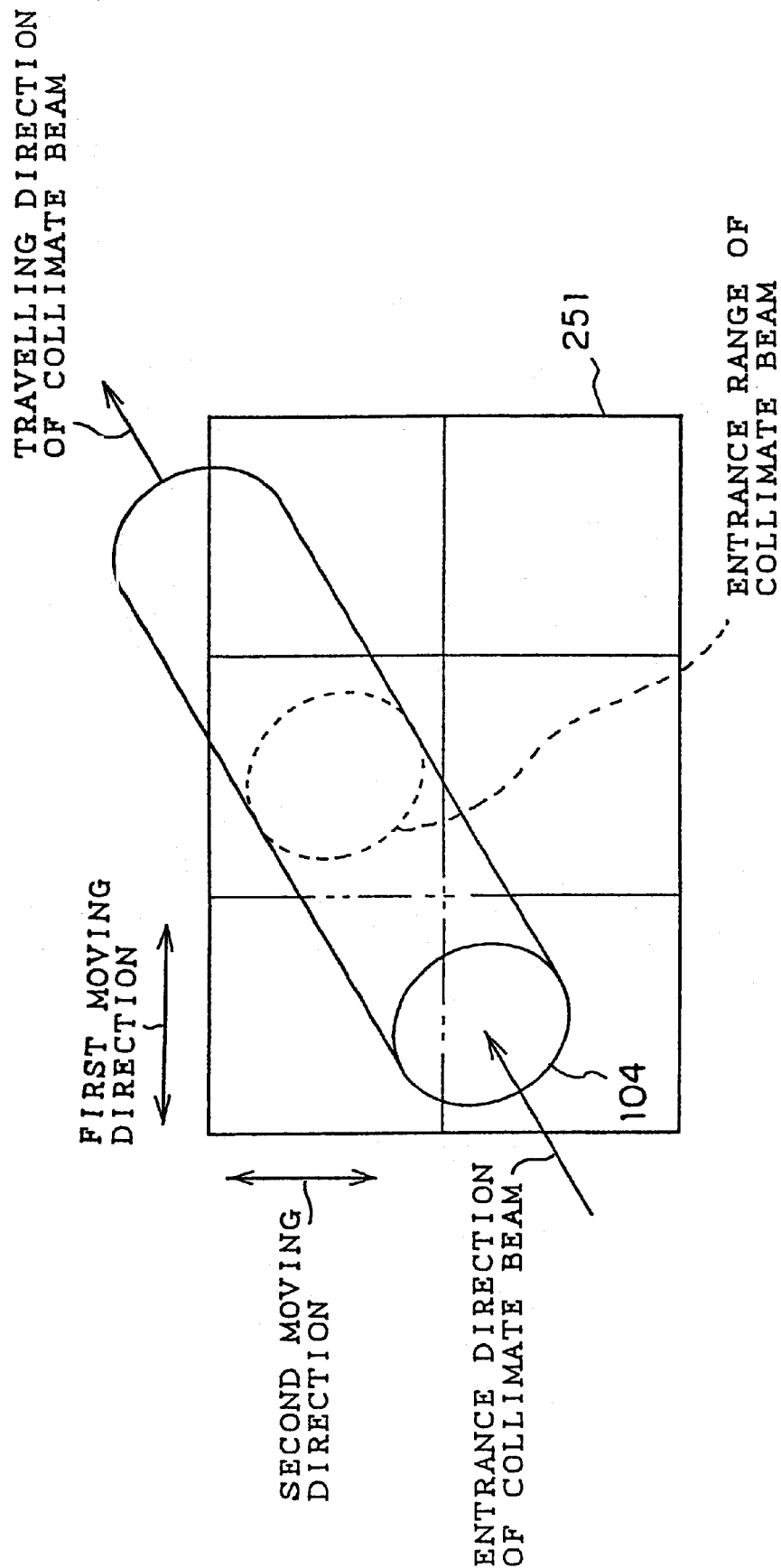
FIG. 20 is an explanatory view illustrating space amplitude modulation using a translating modulation plate according to the present invention.
Figure 21:
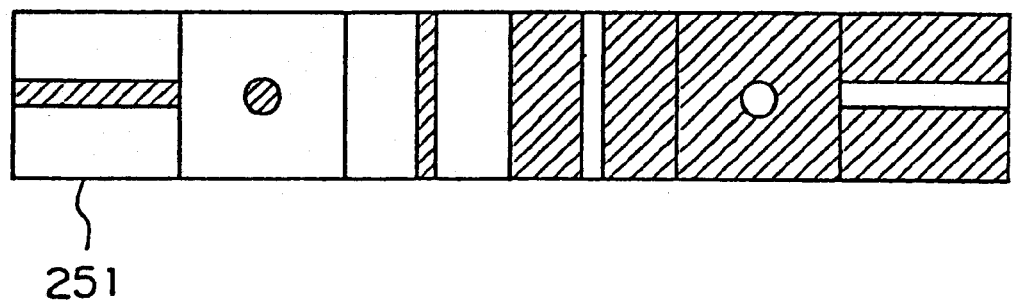
FIG. 21 is a plan view of a modulation plate for primary translation according to the present invention.
Figure 22:
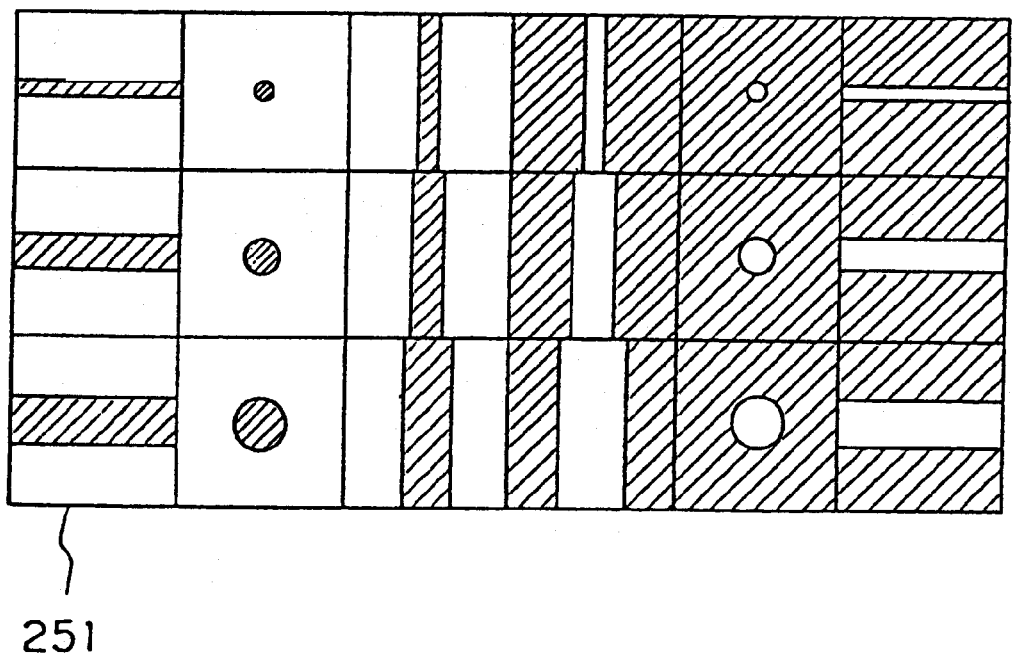
FIG. 22 is a plan view of a modulation plate for secondary translation according to the present invention.
Figure 26:
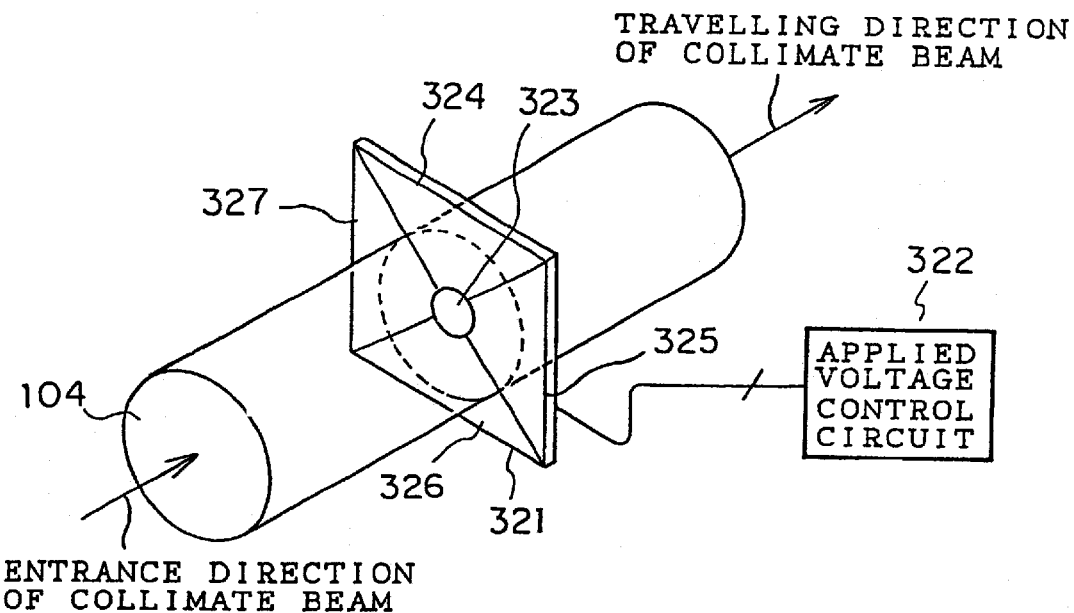
FIG. 26 is an explanatory view illustrating space phase modulation using the flat phase modulator according to the present invention.
Figure 27A:
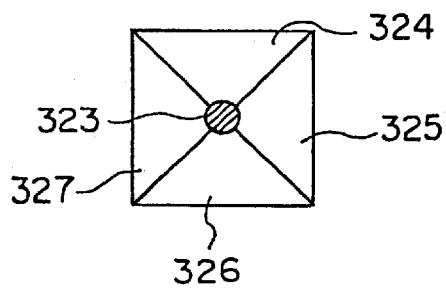
FIG. 27 is an explanatory view illustrating a method of controlling the flat phase modulator according to the present invention.
Figure 27B:
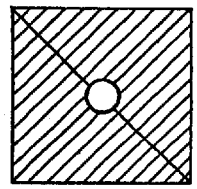
Figure 27C:
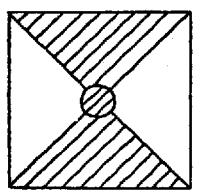
Figure 27D:
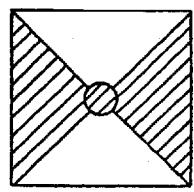

In the embodiment 9 shown in FIG. 20, modulation means includes optical components which are mechanically driven. As shown in FIG. 20, the modulation means of the embodiment 9 includes a flat modulation plate 251 which moves in a one-dimensional direction or in a two-dimensional direction in a plane extending in a direction perpendicular to a travelling direction of a collimate beam 104. That is, modulation patterns are selected by the plane movement of the modulation plate 251 of the embodiment 9. FIGS. 21 and 22 show specific patterns of light transmission factor of the modulation plate 251 as examples.

In the embodiment of the modulation plate 251 shown in FIG. 21, a plurality of modulation patterns are arranged in the one-dimensional direction, and a modulation pattern to provide a desired condensing spot shape can be selected by movement in the one-dimensional direction. In FIG. 21, patterns as described in the conventional super-resolution technique or the above embodiments are employed as the respective modulation patterns. Further, the modulation plate 251 is advantageous in a switching operation of various condensing spot shapes since the number of the modulation patterns can be easier increased in the embodiment 9 than would be increased in the embodiments 5 to 8 in view of a mechanism.

In the embodiment of the modulation plate 251 shown in FIG. 22, a plurality of modulation patterns are arranged in the two-dimensional direction, and a modulation pattern to provide a desired condensing spot shape can be selected by movement in the two-dimensional direction. In FIG. 22, as in the modulation plate 251 shown in FIG. 21, patterns as described in the conventional super-resolution technique or the above embodiments are employed as the respective modulation patterns. Further, the modulation plate 251 is advantageous in a switching operation of various condensing spot shapes since the number of the modulation patterns can be easier increased in the embodiment 9 than would be increased in the embodiments 5 to 8 in view of a mechanism.

Embodiment 10

In the embodiment 10 shown in FIG. 23, optical components are provided to mechanically drive modulation means. In the embodiments 5 to 9, a laser beam is modulated by an amplitude of transmitted light while a phase thereof is modulated in the embodiment 10. Consequently, a configuration of the embodiment 10 is identical with those of the embodiments 5 to 9 except for a modulation plate used to spatially modulate index of refraction with respect to the transmitted light in the embodiment 10.

In the embodiments 5 to 9, the amplitude of the transmitted light is modulated as an example, provided that light transmission factor of a shaded portion is set to zero, and the light transmission factor of the other portion is set to 1. However, as shown in the embodiment 10, the phase of the transmitted light may be modulated by providing a difference between the index of refraction sensed by the transmitted light at the shaded portion and the index of refraction sensed by the transmitted light at the other portion. Thereby, it is also possible to control a condensing spot shape as in the embodiments 5 to 9.

In a system of mechanically switching the modulation means as in the embodiments 5 to 10, a mechanism is simple so that design and fabrication thereof is facilitated, and cost may be possibly reduced.

Embodiment 11

Referring now to FIG. 24, modulation means of the embodiment 11 includes optical components which are electrically driven. As the modulation means, there is employed a flat modulation plate 311 including a plurality of segments 313 to 317. In this case, the respective segments 313 to 317 of the modulation plate 311 are independently controlled by electric information from a control circuit 312 which is externally mounted. A collimate beam 104 passes through the modulation plate 311. As is generally known, in the modulation plate (liquid crystal switch) 311, it is possible to vary a light transmission amount by voltage applied to a control electrode. Therefore, the respective segments 313 to 317 can modulate an amount of transmitted light of the collimate beam 104 passing through the respective segments. As a result, the modulation plate 311 can provide an intensity distribution of a transmitted beam with space modulation.

FIGS. 25(a) to 25(d) show specific embodiments of dividing patterns in the segments of the modulation plate 311. As described above, the modulation plate 311 is divided into five segments 313 to 317 so that the segment 313 is disposed at an intermediate portion of the collimate beam 104, and the segments 314 to 317 are disposed at peripheral portion thereof. In FIGS. 25(a) to 25(d), four types of modulation patterns are illustrated. In the drawings, the shaded portion is set to shade the beam, and the other portion is set to pass the beam. Thereby, it is possible to provide a reduced condensing spot in FIG. 25(a), and provide an extended condensing spot in FIG. 25(b). Further, it is possible to provide a vertically elongated condensing spot in FIG. 25(c), and provide a transversely elongated condensing spot in FIG. 25(d).

It must be noted that the dividing patterns in the segments of the modulation plate 311 should not be limited to this case, and may be designed so as to provide a desired condensing spot shape. In addition, in the operation of the modulation plate 311, a switching speed is faster than that in the mechanical means as described above. As a result, a high speed response can be realized.

Embodiment 12

Though the amount of transmitted light of the laser beam is modulated by the modulation plate 311 in the embodiment 11, in the embodiment 12, a phase of the laser beam is modulated. That is, modulation means of the embodiment 12 is provided with a flat phase modulator including a plurality of segments 323 to 327. The phase modulator 321 includes an electro-optical crystal plate such as LiNbo₃, and a plurality pairs of parallel flat electrodes. The respective pairs of electrodes are independently controlled by electric information from a control circuit 322 which is externally mounted. A collimate beam 104 passes through the modulation plate 321. As is generally known, in the electro-optical crystal plate, index of refraction can be varied by an electric field applied to crystal. Therefore, the respective pairs of electrodes can provide a difference between indexes of refraction of a transmitted beam at an occupied portion so as to modulate the phase of the beam. As a result, in the entire modulation plate 321, it is possible to provide a phase distribution of the transmitted beam with space modulation.

In order to specifically illustrate dividing patterns in the segments 323 to 327, FIGS. 27(a) to 27(d) show four types of modulation patterns. The modulation plate 321 is controlled such that a desired phase difference occurs between the transmitted light at the shaded portion in the drawings and the transmitted light at the other portion. Thereby, it is possible to provide a reduced condensing spot in FIG. 27(a), and provide an extended condensing spot in FIG. 27(b). Further, it is possible to provide a vertically elongated condensing spot in FIG. 27(c), and provide a transversely elongated condensing spot in FIG. 27(d).

Embodiment 13

Figure 28:
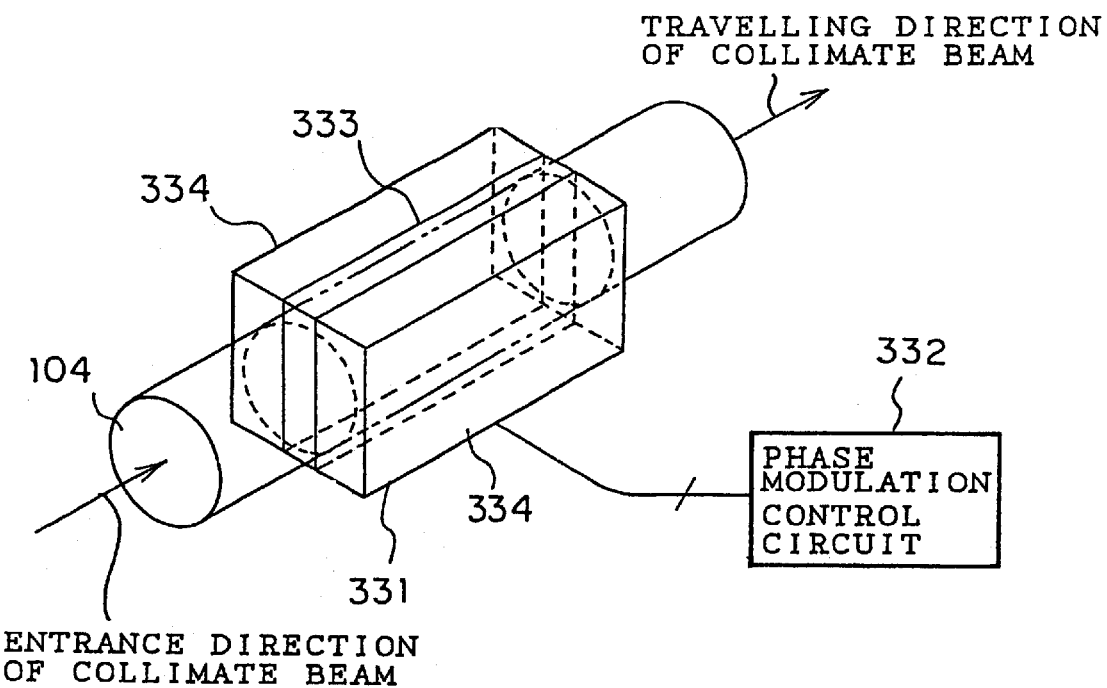
FIG. 28 is an explanatory view illustrating space phase modulation using a bulk-like phase modulator according to the present invention.

FIG. 28 shows phase modulation means which is provided with a bulk-like phase modulator 331 including a plurality of segments 333 to 335. The phase modulator 331 includes an electro-optical crystal plate such as KDP, and a pair of parallel flat electrodes. The pair of electrodes are independently controlled by electric information from an external control circuit 332. A collimate beam 104 passes through the modulator 331.

Figure 29:
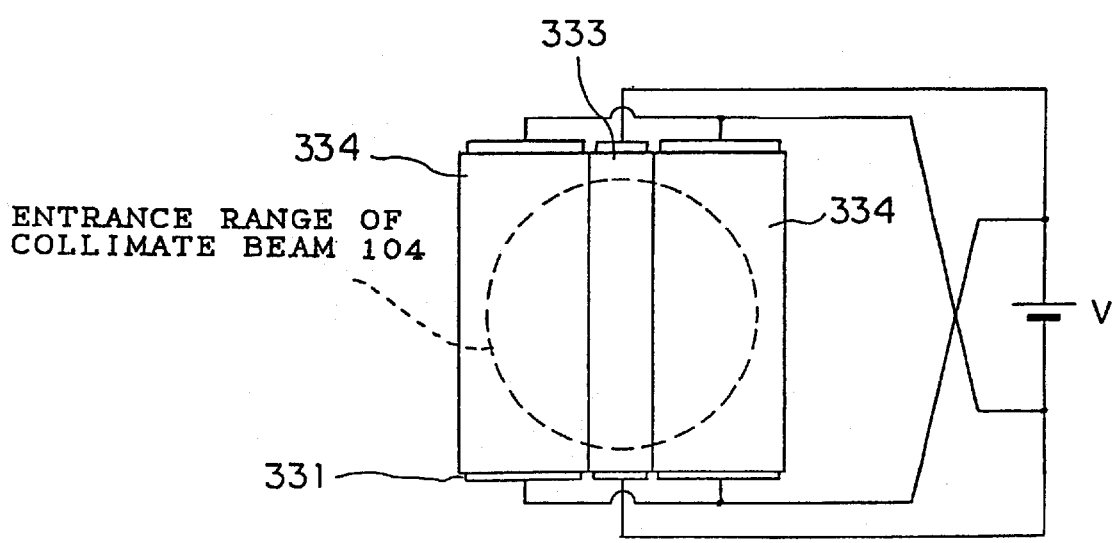
FIG. 29 is a front view of the bulk-like phase modulator according to the present invention.

Specifically, the segments 333 to 334 are divided into, for example, three segments as shown in FIG. 29. There is provided a difference between indexes of refraction by applying voltage V and inverse voltage V to the intermediate segment 333, and the two outer segments 334, respectively. Thereby, the phase can be modulated by the difference in the index of refraction with respect to the collimate beam 104 passing through the segments 333 to 334. Further, space modulation is provided to a phase distribution of the transmitted beam on an emission surface of the phase modulation means. It is thereby possible to control a condensing spot shape depending upon the same operation principle as that in the embodiment 3.

Alternatively, the phase modulation means may include the intermediate segment 333, exclusively. In this case, air having index of refraction of 1 serves as the outer segments 334, 334.

In a system of switching by electric means as described in the embodiments 11 to 13, a switching speed is typically faster than that in the mechanical means as described in the embodiments 5 to 10. As a result, a high speed response can be possibly realized. Additionally, the system requires no movable portion so that high reliability can be expected.

Embodiment 14

A description will now be given of a condensing spot switching method in an optical disk unit which is equipped with a beam condensing apparatus described in the embodiments 1 to 13. An optical disk in accordance with the ISO standard, which has been put to practical use, has a track pitch of 1.6 μm as set forth above. Another optical disk which has been studied according to the next generation ISO standard, has a track pitch in a range of 1.3 to 1.4 μm. Further, other optical disks having the track pitches of 1.2, 1.0, or 0.8 μm will be developed in the future.

Figure 30:
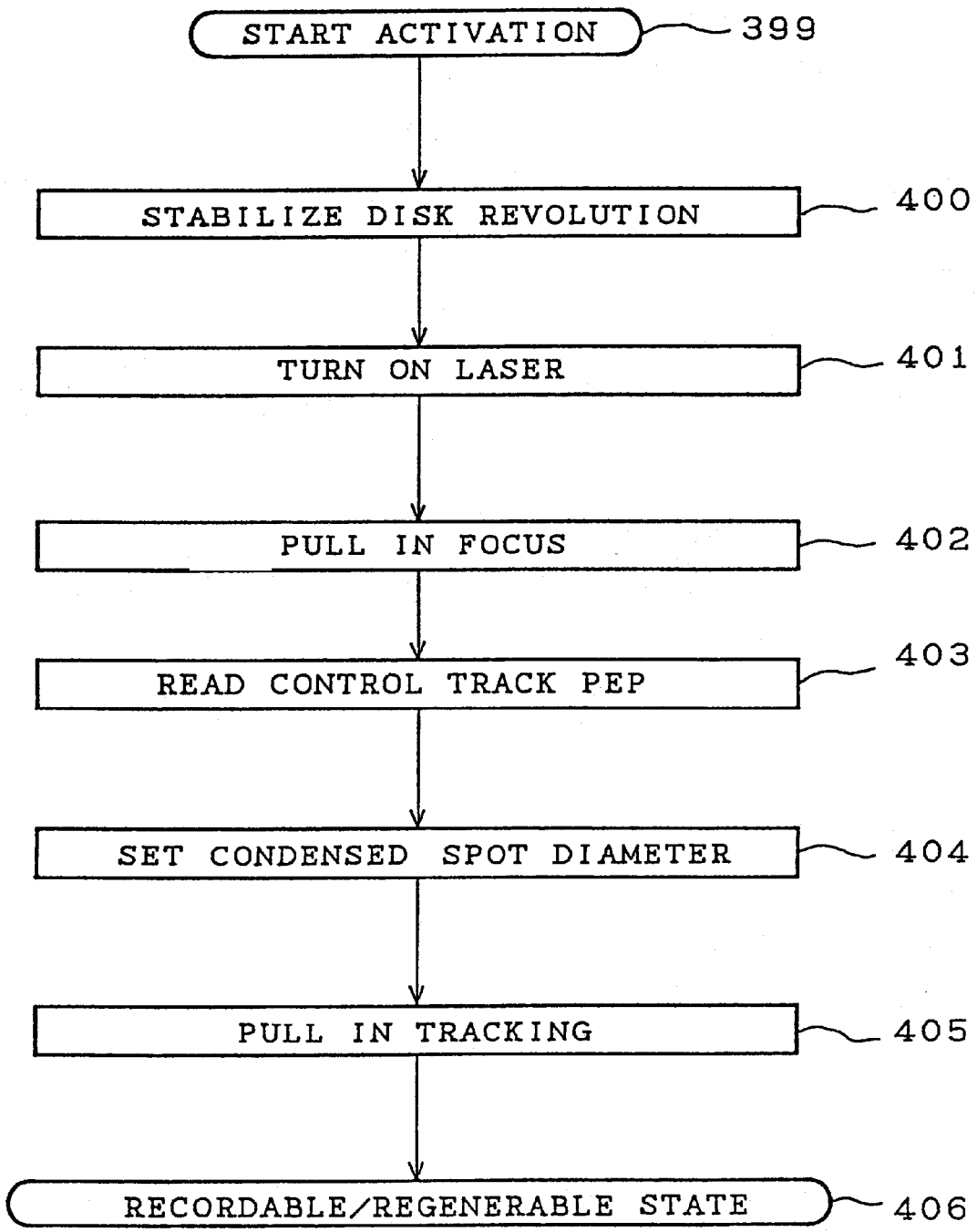
FIG. 30 is a diagram showing the algorithm which illustrates a compatibility ensuring procedure with respect to various types of track pitches according to the present invention.

FIG. 30 shows algorithm in case the optical disks having the different track pitches as described above are driven by the same optical disk unit. First, the optical disk is mounted on the optical disk unit, and the optical disk is activated (in Step 399). Subsequently, the disk revolution is stabilized (in Step 400), and a laser is turned ON (in Step 401). Next, a focus servo is pulled in (in Step 402), and after completion of the focus pulling in, control track information in PEP is read at a control track PEP area (in Step 403). The control track information includes information relevant to the track pitch.

Further, a condensing spot diameter is switched over depending upon a read value of the track pitch. Thereby, the optical disk unit is set to manage the condensing spot diameter which is adaptable to the track pitch (in Step 404). Subsequently, a tracking servo is pulled in as in the prior art (in Step 405), and a recordable and regenerable state is established (in Step 406).

A description will now be given of a mode setting method of the condensing spot diameter in case the modulation means of the embodiment 4 shown in FIG. 8 is employed in the optical disk unit with reference to FIG. 31. First, if it is found that the driven disk has the track pitch of 1.0 $\mu$m depending upon the PEP information, an intermediate portion of a collimate beam is shaded by the modulation means 111 to reduce the condensing spot diameter. Alternatively, if the driven disk has the track pitch of 1.6 $\mu$m, a peripheral portion of the collimate beam is shaded by the modulation means 111 to extend the condensing spot diameter. Further, if the driven disk has the track pitch of 1.2 $\mu$m, the collimate beam is not shaded by the modulation means 111 to provide the condensing spot diameter as in the prior art.

In the method as described above, the optical disks having various types of track pitches can be driven by only one optical disk unit by switching the condensing spot diameter according to the track pitches. As a result, it is possible to ensure compatibility to the optical disks based upon the different standards with sufficient performance and reliability.

Embodiment 15

Figure 32:
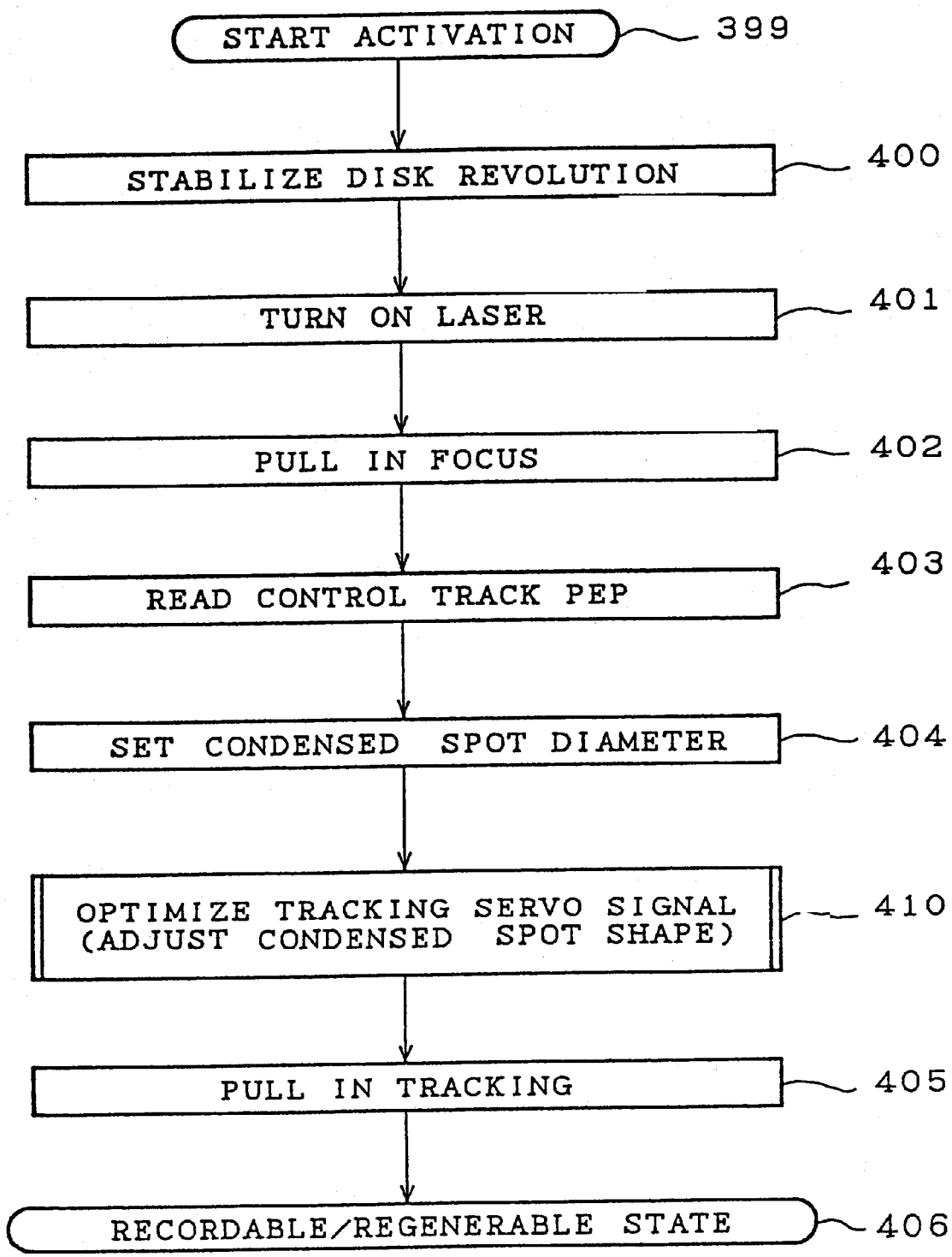
FIG. 32 is a diagram showing the algorithm which illustrates a condensing spot size optimizing procedure for tracking according to the present invention.

FIG. 32 shows algorithm illustrating a condensing spot switching method according to the embodiment 15. In the embodiment 15, the operation proceeds, as in the embodiment 14, from Step 399 where an optical disk is activated to Step 404 where a condensing spot diameter is switched over to an appropriate condensing spot diameter according to a track pitch. However, in the embodiment 15, the operation proceeds from Step 404 to Step 410 where an amplitude of a tracking servo sensor signal is monitored by a monitor circuit 421 (see FIG. 33), and a modulation amount in modulation means 111 is adjusted so as to maximize the amplitude.

FIG. 33 shows the above-mentioned monitor circuit 421 for the amplitude of the sensor signal. An optical disk unit is set to have the optimal condensing spot diameter for tracking by automatically adjusting to provide the optimal tracking servo signal in Step 410, and thereafter the optical disk unit conventionally pulls in a tracking servo in Step 405, and is in a recordable and regenerable state (in Step 406). In this case, it is also possible to monitor a track crossing signal, a discrete sensor signal, or a tracking error signal obtained by a difference between the sensor signals instead of monitoring the tracking servo signal.

By the process described in embodiment 15, it is possible to absorb variation in a tracking servo signal characteristic which is different for each combination of an optical disk medium and the optical disk unit, and to extend a servo stability margin. Further, optimization of the tracking error signal waveform is effective in prevention of counting error during a seek operation of a track, and results in realizing reduction of a mean seek time and improvement of seek reliability.

Embodiment 16

Figure 34:
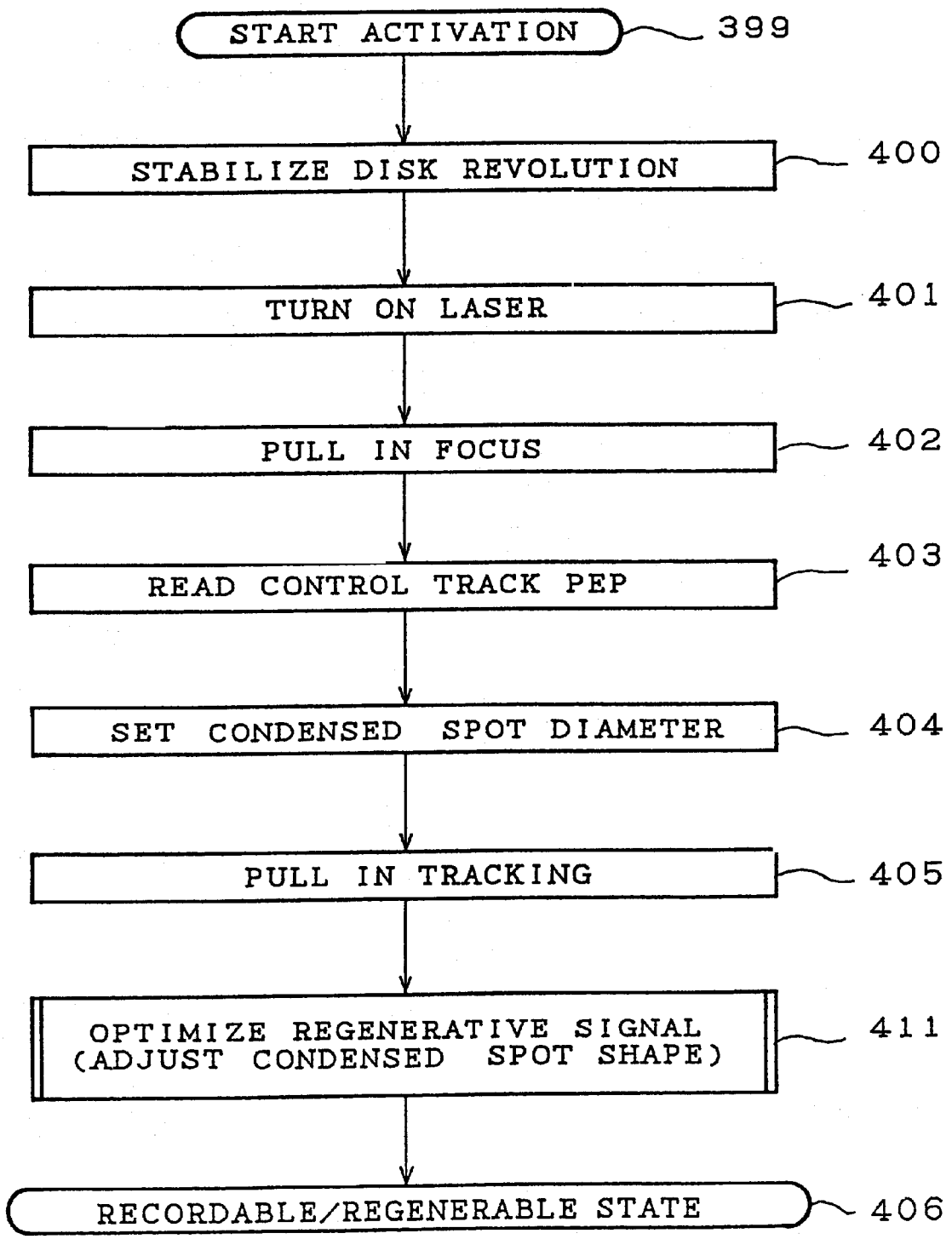
FIG. 34 is a diagram showing the algorithm which illustrates a condensing spot size optimizing procedure for signal regeneration according to the present invention.

FIG. 34 shows algorithm illustrating a condensing spot switching method according to the embodiment 16. In the embodiment 16, the operation proceeds, as in the above embodiment, from Step 399 where an optical disk is activated to Step 405 where a tracking servo is pulled in. However, in the embodiment 16, the operation proceeds from Step 405 to Step 411 where an amplitude of a regenerative signal of an emboss signal is monitored by a monitor circuit 431 (see FIG. 35), and a modulation amount in modulation means 111 is adjusted so as to maximize the amplitude of the regenerative signal at the maximum frequency. FIG. 35 shows the above-mentioned monitor circuit 431 for the amplitude of the regenerative signal. An optical disk unit is set to have the optimal condensing spot diameter for data regeneration by automatic adjustment to optimize the regenerative signal in Step 411, and thereafter the optical disk unit is in a recordable and regenerable state as in the prior art in Step 406.

Here, in case the modulation means as described in the embodiment 11 is employed, it is possible to independently adjust the amplitudes of the tracking servo signal and the regenerative signal when a condensing spot shape is adjusted by the modulation means. By the process described in embodiment 16, it is possible to absorb variation in a data regeneration signal characteristic which is different for each combination of an optical disk medium and the optical disk unit, and to extend a regenerative signal detection margin. As a result, it is possible to improve reading accuracy of a signal with respect to the optical disks in accordance with many generations standards, and various types of standards, and to realize the data regeneration with higher reliability and a smaller number of error.

Embodiment 17

The embodiments 14 to 16 have been described with reference to a case where the condensing spot is switched depending upon the control track information. In addition to the case, it is also possible to improve a performance of an optical disk unit by switching the condensing spot according to an operation mode of an optical disk unit.

FIG. 36 shows relations between a shape of a condensing spot 511 and a dimension of a track 512 corresponding to each optical disk operation mode. At a time of seek, a modulation amount of modulation means 111 is set so as to provide a condensing spot width which can provide the optimal tracking servo signal for the seek, i.e., a track crossing signal by, for example, a method as described in the embodiment 15. Further, at a time of regeneration, the modulation amount of the modulation means 111 is set so as to provide a condensing spot length and a condensing spot width which can provide the optimal regenerative signal by, for example, a method as described in the embodiment 16.

At a time of recording, the spot diameter is not restricted. In a system to modulate an amplitude of a collimate beam by the modulation means 111, there is great loss of laser power as set forth above. On the other hand, in an optical disk unit, the upper bound of a data transfer rate (i.e., disk revolution) is restricted due to limit of the maximum output power of a semiconductor laser, or the upper bound of recording power which is available in a recording medium is restricted. Thus, the loss of the laser power is a major issue in view of a performance. Hence, it is preferable that the optical disk is driven without the amplitude modulation at the time of recording or erasing. Meanwhile, a recording can be performed even if the condensing spot diameter at the time of recording is not reduced to an extent of reduction at the time of regeneration. The method described in the embodiment 17 enables an operation that no amplitude modulation is provided at the time of recording while the condensing spot diameter is reduced at the time of regeneration.

At the time of erasing, the condensing spot width is extended so as to cover a full recording track width in which a recording mark exists.

According to the embodiment 17 using the method as described above, it is possible to improve reading accuracy of a signal with respect to the optical disks having different recording densities and track pitches in accordance with many generations standards, and various types of standards so as to realize the data regeneration with higher reliability and a smaller number of error. Further, highly reliable data recording can be realized with no crosstalk because erroneously unerased data is prevented from being left. In addition, according to the embodiment 17, a super-resolution technique can be used to regenerate a high density recording data, and high recording power can be also provided. It is thereby possible to further improve compatibility for various types of optical disks in accordance with different standards.

Embodiment 18

The embodiment 18 is identical with the embodiment 17 in that a condensing spot switching function is applied to improve a performance. However, the embodiment 18 is different from the embodiment 17 in that an additional method is employed in the embodiment 18 to vary a condensing spot shape when retry process is executed to reread a sector in which regeneration becomes impossible due to many errors at a time of data regeneration.

Figure 37:
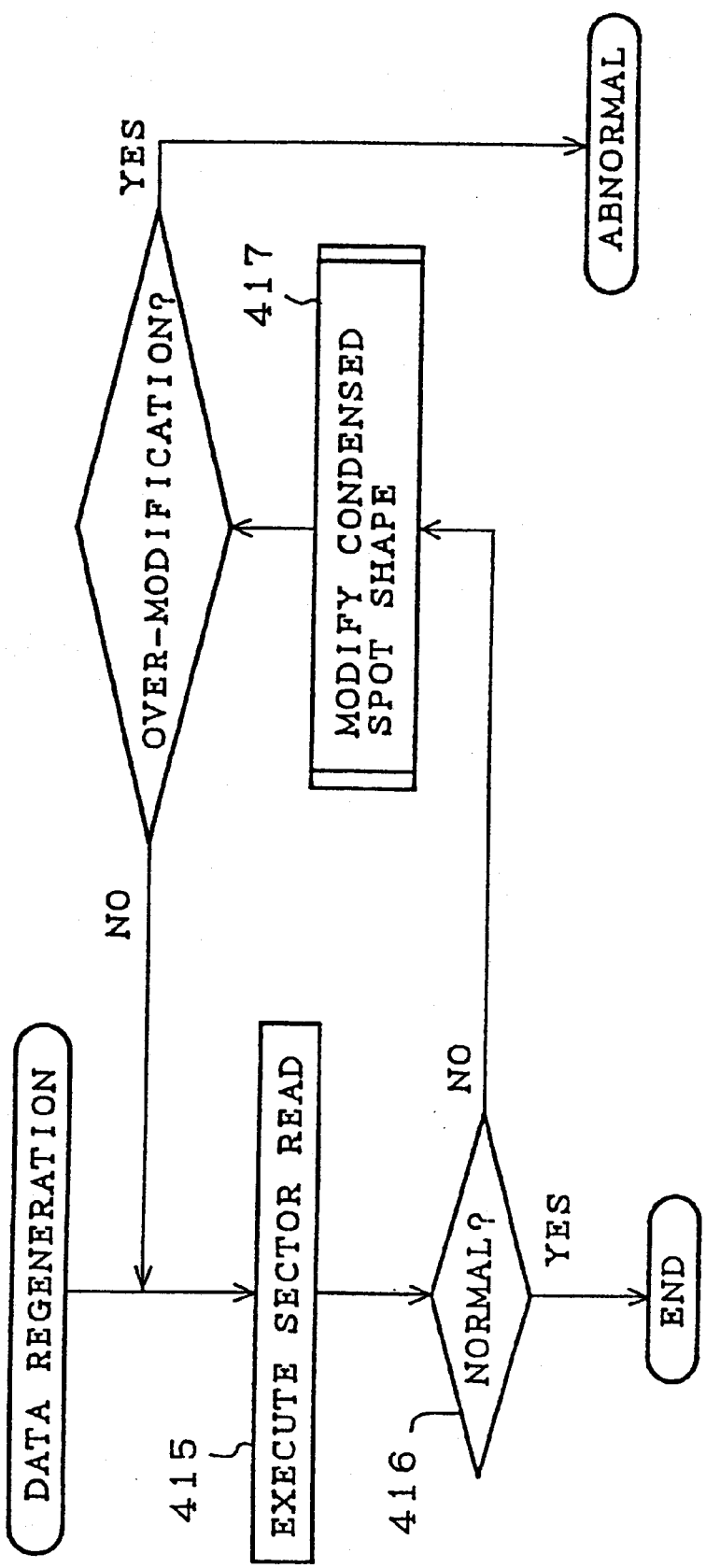
FIG. 37 is a diagram showing the algorithm which illustrates a method of improving retry processing ability for regeneration by adjusting the condensing spot diameter according to the present invention.

FIG. 37 shows algorithm according to the embodiment 18. According to the algorithm in FIG. 37, sector read is executed in Step 415, and if it is decided that the sector read is not normal in Step 416, the condensing spot shape is modified in Step 417 and the sector read is executed in Step 415 again. As set forth above, in the embodiment 18, a modulation signal set to provide the condensing spot to be optimal is varied in a predetermined range so as to perform retry regeneration. It is thereby possible to increase possibility that a condition incapable of reading the signal can be avoided, and improve reliability of data retention.

Embodiment 19

Figure 39:
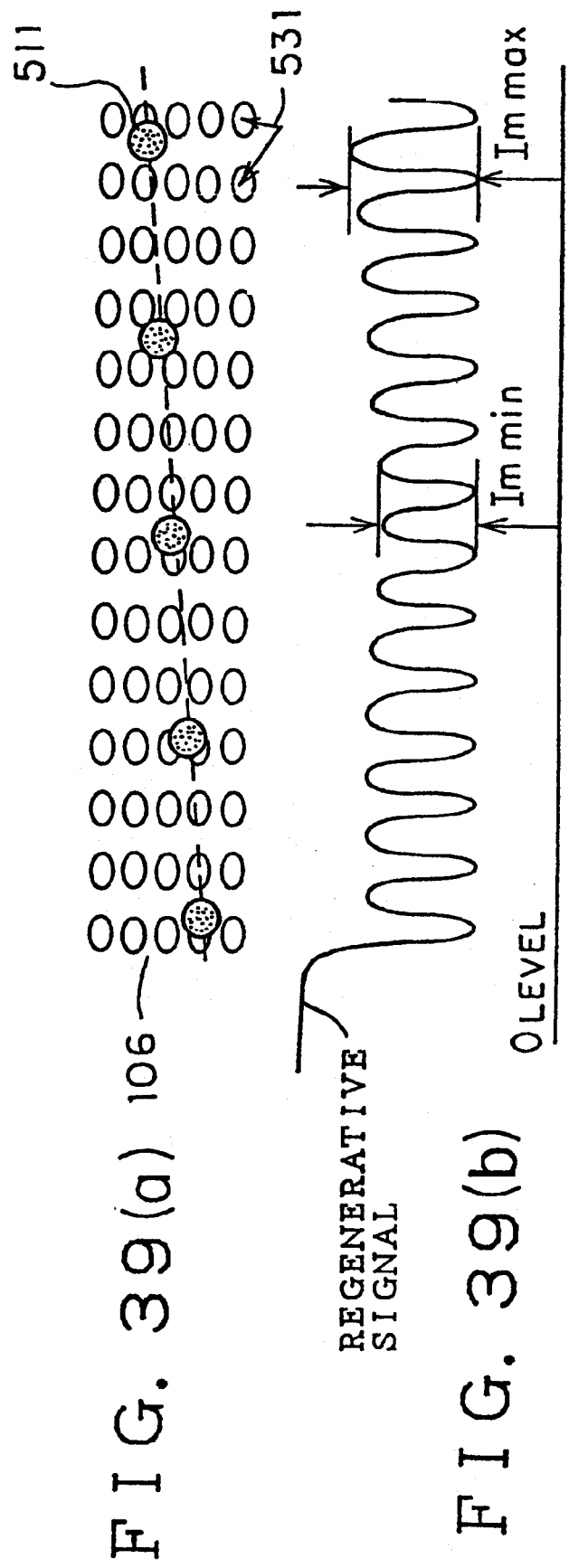
FIG. 39 is an explanatory view illustrating a relation between the condensing spot and recorded bits at a time of reading PEP in control track area.

FIG. 39 shows shapes of recording bits 531 in the control track PEP area as described in the embodiment 14, a condensing spot 511 scanning on the recording bit, and a regenerative signal waveform at this time.

Information is recorded in very low density, and is encoded in a system in which one area having the recording bits 531 and the other area having no recording bit are alternated at a very long interval. The recording bit 531 has a diameter of 0.4 $\mu$m, and is regularly disposed on a period of about 0.8 $\mu$m. There has been no problem since regeneration in the prior art is performed by a condensing spot having a larger diameter than that of the recording bit 531. However, in case the condensing spot 511 is reduced, there is a problem in that no regenerative signal can be obtained, and erroneous regeneration data occurs when the condensing spot 511 passes just between recording bit sequences even if the area having the recording bit is regenerated.

Figure 38:
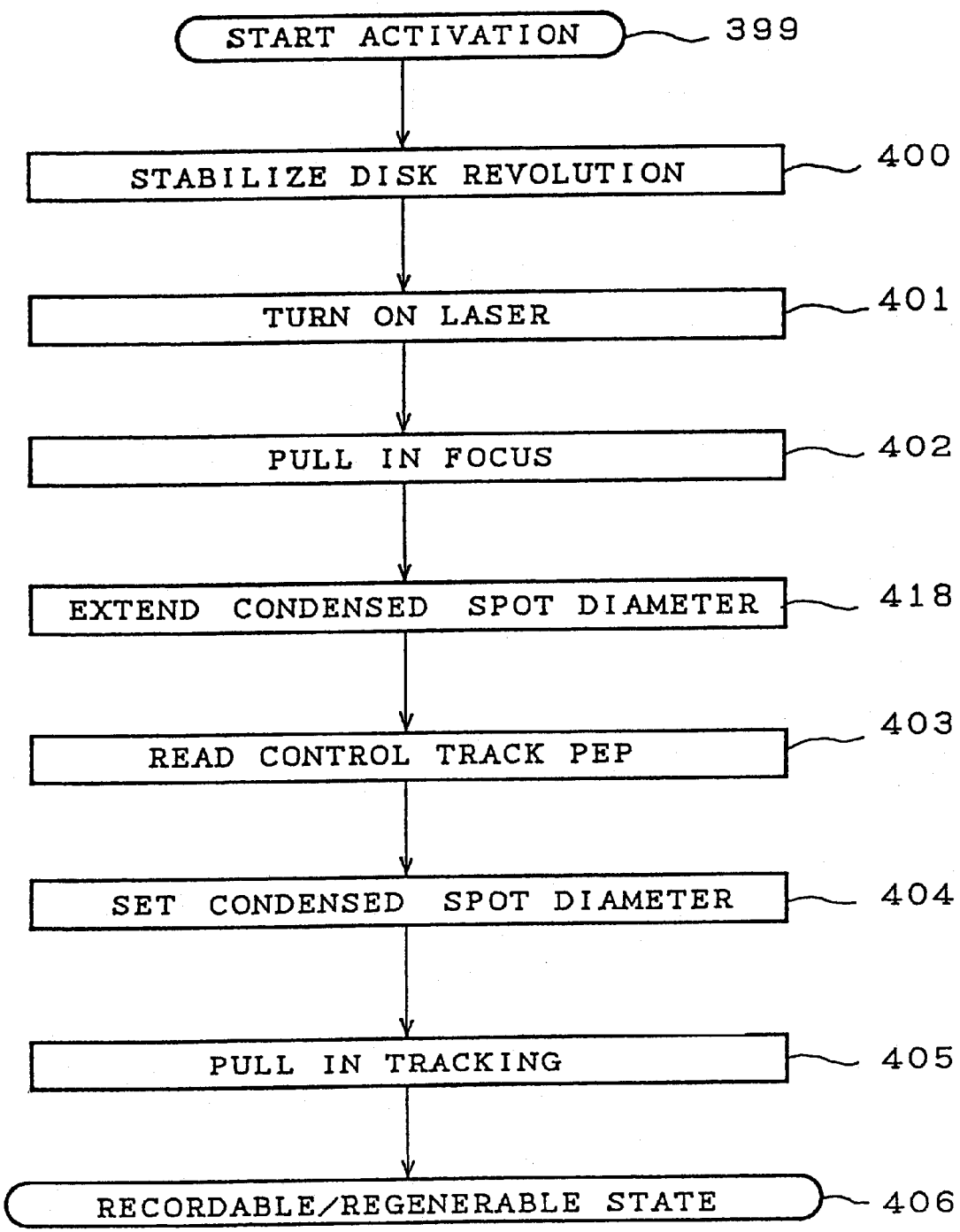
FIG. 38 is a diagram showing the algorithm which illustrates a method of improving PEP reading ability by adjusting the condensing spot diameter according to the present invention.

Hence, in the embodiment 19, the condensing spot diameter is extended at a time of PEP area regeneration in Step 418 as shown in the algorithm of FIG. 38. As a result, it is possible to improve reading accuracy of the control track PEP area with respect to any type of optical disk, and to reduce a mean drive starting time. The PEP area accommodates the most basic parameter, and is first read at a time of activating the disk. There is a great effect of improvement of reliability of the read.

Embodiment 20

In the embodiment 20, a condensing spot diameter is extended in both vertical and lateral directions so as to equivalently reduce numerical aperture NA of an objective lens 105 (see FIG. 4) as the condenser. As is generally known, in a condensing system employing a lens, as the numerical aperture NA becomes larger, a depth of focus becomes shallower.

Typically, in a focus control system of an optical disk unit, as the numerical aperture NA becomes larger and the depth of focus becomes shallower, a follow-up capability of a focus servo is more reduced due to surface fluttering of the disk and inclination of a disk surface. In particular, the focus control system is easily affected by external disturbance such as surface fluttering so that a focus pulling in failure easily occurs. The failure leads a retry operation, resulting in a longer activating time.

Figure 40:
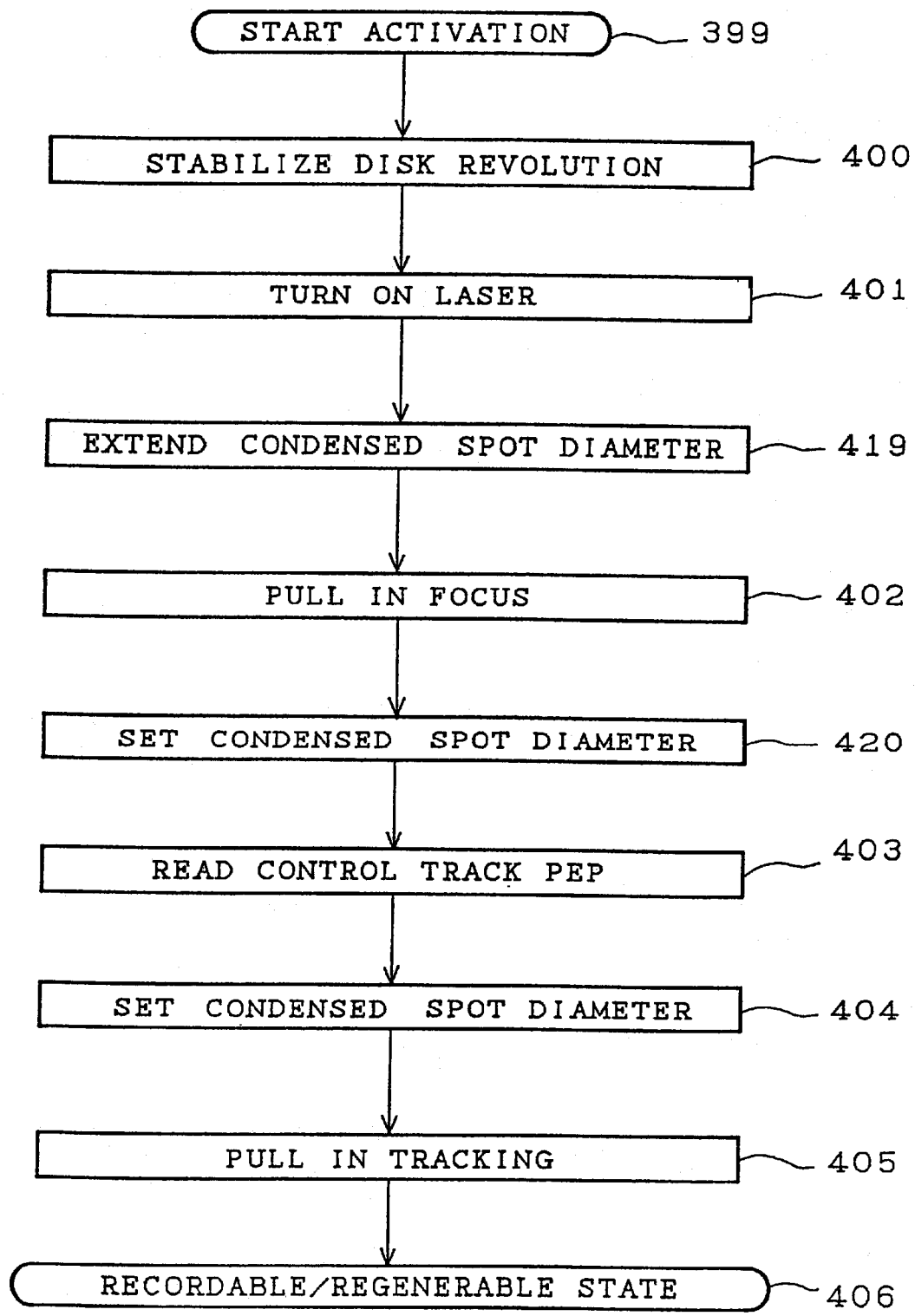
FIG. 40 is a diagram showing the algorithm which illustrates a focus pulling in stabilizing procedure by adjusting the condensing spot diameter according to the present invention.

Hence, in the embodiment 20, as shown in the algorithm in FIG. 40, the condensing spot diameter is extended in both the vertical and lateral directions (in Step 419) before starting to pull in the focus (in Step 402), and in this condition, the focus pulling in is completed. According to later Steps as described in the embodiments 14 to 16, the condensing spot is set (in Step 420). As a result, it is possible to improve stability of the focus pulling in, and reduce a means drive starting time. Further, it is possible to extend a focus pulling in range with respect to any type of optical disk so that a disk receiving range can be extended, and compatibility and versatility can be also improved.

As set forth above, according to the first aspect of the present invention, it is possible to use the small-diameter condensing spot with respect to the high recording density medium, and use the large-diameter condensing spot with respect to the low recording density medium. As a result, there is an effect in that various types of optical recording media having different recording capacity can be managed by the same optical head.

According to the second aspect of the present invention, the light beam condensing apparatus is provided with the control means for controlling the modulation means. As a result, there is an effect in that it is possible to control the modulation means in response to a signal from the control means.

According to the third aspect of the present invention, the transmission factor of the collimate beam is varied so as to vary the shape of the condensing spot. As a result, as in the first aspect, there is an effect in that various types of optical recording media having different recording capacity can be managed by the same optical head.

According to the fourth aspect of the present invention, the phase of the collimate beam is varied so as to vary the shape of the condensing spot. Therefore, it is possible to reduce and extend the diameter of the condensing spot without shading the collimate beam. As a result, there is an effect in that the loss of power due to the shading can be avoided.

According to the fifth aspect of the present invention, the shape of the condensing spot can be switched over by simply rotating the flat modulation means. As a result, there is an effect in that the light beam apparatus can have a simpler configuration.

According to the sixth aspect of the present invention, the flat modulation means is provided rotatably about the optical axis so that the condensing spot can be reduced in all directions. As a result, there is an effect in that the large servo signal can be obtained by reducing the condensing spot diameter in the radial direction of the optical recording medium during the seek, and the large information regeneration signal can be obtained by reducing the condensing spot diameter in the circumferential direction of the optical recording medium during the regeneration.

According to the seventh aspect of the present invention, the two kinds of condensing spot diameters can be switched over from one to another. As a result, there is an effect in that the small-diameter condensing spot can be used for the high recording density medium, and the wide-width track pitch of the low recording density medium can be managed by extending the condensing spot in the radial direction of the optical recording medium.

According to the eighth aspect of the present invention, it is possible to form the plurality of modulation patterns on the peripheral surface of the cylindrical body which is rotatably supported. As a result, there is an effect in that different types of the shapes of the condensing spot can be provided.

According to the ninth aspect of the present invention, it is possible to set the mode to provide the collimate beam with no modulation, the mode to provide the first modulation, and the mode to provide the second modulation. As a result, there is an effect in that the three kinds of modulation modes can be optionally selected.

According to the tenth aspect of the present invention, it is possible to easily increase the number of the modulation patterns. As a result, there is an effect in that multi-stage switching can be performed in the shape of the condensing spot.

According to the eleventh aspect of the present invention, it is possible to electrically vary the modulation pattern so as to accelerate the switching speed. As a result, there is an effect in that the high speed response can be realized.

According to the twelfth aspect of the present invention, the modulation pattern of the modulation means is formed by the rectangular modulation section which is positioned at the intermediate portion of the collimate beam, and has the longitudinal side longer than the collimate beam diameter. As a result, there is an effect in that it is possible to reduce or extend the diameter of the condensing spot in one direction.

According to the thirteenth aspect of the present invention, the modulation pattern of modulation means is formed by the circular modulation section which is positioned coaxially with the collimate beam, and has the diameter smaller than the collimate beam diameter. As a result, there is an effect in that it is possible to reduce or extend the diameter of the condensing spot in all directions.

According to the fourteenth aspect of the present invention, the condensing spot can be switched over according to the track pitch of the optical recording medium. Thus, the optical recording media having various types of track pitches can be driven by only one drive unit. As a result, there is an effect in that it is possible to ensure compatibility to the optical recording media in accordance with the different standards with sufficient performance and reliability.

According to the fifteenth aspect of the present invention, it is possible to absorb the variation in the tracking servo signal which is different for each combination of the optical recording medium and a drive unit thereof. As a result, there is an effect in that margin of the servo stability can be extended.

According to the sixteenth aspect of the present invention, it is possible to absorb the variation in the information regeneration signal characteristic which is different for each combination of the optical recording medium and a drive unit thereof. As a result, there is an effect in that the signal reading accuracy can be improved with respect to the optical recording media in accordance with various standards so as to realize highly reliable information regeneration with a smaller number of error.

According to the seventeenth aspect of the present invention, it is possible to improve reading accuracy of the track pitch information in the control track area with respect to various types of optical recording media. As a result, there is an effect in that the mean drive starting time can be reduced.

According to the eighteenth aspect of the present invention, it is possible to improve the stability of the focus pulling in so that the mean drive starting time can be reduced. Further, the focus pulling in range can be extended. As a result, there is an effect in that the receiving range of the optical recording medium can be extended, and compatibility and versatility can be also improved.

According to the nineteenth aspect of the present invention, it is possible to provide the amplitude modulation to the collimated beam at the time of seek and regeneration, and provide no amplitude modulation to the collimated beam at the time of recording so that the loss of laser beam at the time of recording can be avoided. As a result, there is an effect in that it is possible to use the super-resolution technique to regenerate the high density recording information, and provide the high laser power of condensed spot to record information.

According to the twentieth aspect of the present invention, it is possible to improve possibility that the condition incapable of reading the signal can be avoided. As a result, there is an effect in that reliability of information retention can be improved.

While preferred embodiments of the invention have been described using specific terms, such description is for illustrative purposes only, and it is to be understood that changes and variations may be made without departing from the spirit or scope of the following claims.

What is claimed is:

1. A method of driving an optical recording medium by applying a light beam condensing apparatus, the method comprising:

emitting a laser beam from a laser oscillator;

reading track pitch information in a control track area by a condensing beam emitted from said light beam condensing apparatus, transforming said emitted laser beam into a collimate beam, and condensing and introducing said collimate beam into said control track area of the optical recording medium;

modulating said collimate beam by controlling modulation means of said light beam condensing apparatus depending upon said read track pitch information;

setting a condensing spot shape of said condensing beam introduced into said control track area of said optical recording medium to be adaptable to said track pitch;

detecting an amplitude of a tracking servo sensor signal at a time of said setting of the shape of said condensing spot;

adjusting said shape of said condensing spot by controlling said modulation means so as to maximize said detected amplitude; and performing recording and regeneration of said optical recording medium at said adjusted condensing spot.

2. The method according to claim 1, further comprising:

detecting an amplitude of a regenerative signal of an emboss signal prior to performing regeneration of said optical recording medium at said condensing spot; and adjusting to provide an optimal condensing spot shape for information regeneration by controlling said modulation means so as to maximize said detected amplitude.

3. The method according to claim 1, further comprising:

setting said condensing spot shape to have a large diameter by controlling said modulation means of said light beam condensing apparatus prior to reading said track pitch information in said control track area.

4. The method according to claim 1, further comprising:

setting said condensing spot shape to be large by controlling said modulation means of said light beam condensing apparatus prior to focus pulling in for reading said track pitch information in said control track area.

* * * * *